United States Patent
Elbert

(10) Patent No.: US 10,777,984 B1
(45) Date of Patent: Sep. 15, 2020

(54) PRE-WIRED JUNCTION BOX WITH QUICK-CONNECT CLIP ELECTRICAL WIRE CONNECTORS

(71) Applicant: Richard M. Elbert, Kansas City, MO (US)

(72) Inventor: Richard M. Elbert, Kansas City, MO (US)

( * ) Notice: Subject to any disclaimer, the term of this patent is extended or adjusted under 35 U.S.C. 154(b) by 0 days.

(21) Appl. No.: 16/430,366

(22) Filed: Jun. 3, 2019

(51) Int. Cl.
| | |
|---|---|
| *H02G 3/16* | (2006.01) |
| *H01R 11/07* | (2006.01) |
| *H01R 4/48* | (2006.01) |
| *H01R 11/01* | (2006.01) |
| *H01R 11/09* | (2006.01) |

(52) U.S. Cl.
CPC ............... *H02G 3/16* (2013.01); *H01R 4/48* (2013.01); *H01R 11/01* (2013.01); *H01R 11/07* (2013.01); *H01R 11/09* (2013.01)

(58) Field of Classification Search
CPC . H02G 3/16; H01R 4/48; H01R 11/01; H01R 11/07; H01R 11/09
USPC .................................. 439/723, 76.2
See application file for complete search history.

(56) References Cited

U.S. PATENT DOCUMENTS

| | | | | |
|---|---|---|---|---|
| 2,092,435 A * | 9/1937 | Troisi | ................... | B63G 8/41 114/328 |
| 2,857,508 A * | 10/1958 | Klugman | ................. | F21S 8/02 362/364 |
| 6,201,187 B1 * | 3/2001 | Burbine | ............... | H01R 13/465 174/53 |
| 10,411,401 B1 * | 9/2019 | Krize | .................... | G06F 1/18 |
| 2002/0150372 A1 * | 10/2002 | Schray | ................. | G02B 6/3897 385/135 |
| 2003/0010520 A1 * | 1/2003 | Ewald | .................. | H01R 25/168 174/666 |
| 2006/0121785 A1 * | 6/2006 | Caggiano | ............... | G01R 22/06 439/607.41 |
| 2008/0053698 A1 * | 3/2008 | Purves | ..................... | H01R 9/24 174/520 |
| 2008/0128453 A1 * | 6/2008 | Burckholter | ............. | B67D 7/34 222/75 |
| 2010/0018739 A1 * | 1/2010 | Libby | ................. | H01R 13/514 174/58 |
| 2010/0084184 A1 * | 4/2010 | Phillips | .................... | H02G 3/00 174/535 |
| 2010/0208433 A1 * | 8/2010 | Heimann | ................. | H04Q 1/10 361/724 |

(Continued)

FOREIGN PATENT DOCUMENTS

GB            1496683         * 11/2011

*Primary Examiner* — Harshad C Patel
(74) *Attorney, Agent, or Firm* — Invention Protection Associates, LLC

(57) ABSTRACT

A modular junction box device that houses port sub-housings which each contain electrically-conductive connector clips that facilitate quick, push-in electrical connection of the hot, neutral and ground wires within a supply wire cable leading from a power source with the corresponding distribution wires leading to each of any number powered devices. The invention utilizes internalized push-in connectors to allow a single supply electrical wire cable (line in) to be connected to multiple distribution wire cables (lines out) without the need for a proportionate amount of internal wiring that ordinarily connects supply and distribution wires inside of a junction box.

17 Claims, 37 Drawing Sheets

(56) References Cited

U.S. PATENT DOCUMENTS

2014/0205504 A1* 7/2014 Khoshbin ............... C01B 13/10
                                                    422/108
2015/0295339 A1* 10/2015 Bartholomew ...... H01R 13/447
                                                    439/131
2016/0241002 A1* 8/2016 Tremaine ................. H02B 1/44

* cited by examiner

PRE-WIRED JUNCTION BOX WITH QUICK-CONNECT CLIP ELECTRICAL WIRE CONNECTORS

BACKGROUND

The present invention generally relates to devices used in electrical wiring in the residential and commercial development contexts, and it is specifically directed to a modular junction box device that can house a significant number of ports that each contain at least three electrically-conductive connector clips that facilitate quick, push-in electrical connection of the hot, neutral and ground wires within a supply wire cable leading from a power source with the corresponding distribution wires leading to each of any number of external electrical devices (which, hereinafter, may be referred to as "powered devices"). Even more specifically, it is directed to such a modular junction box housing having a suitable number of ports, or sub-housings within which at least three of those push-in wire connector clips are enclosed, host plug-in connection of the multiple wires of the supply wire cable leading from a power source into one port and host plug-in connection of the multiple wires of the distribution wire cable leading to each powered device into each of another port(s), where each such connector clip is also conductively connected to a loop of hot, neutral or ground wire contained within the junction box housing.

The simple nature of the quick, push-in circuit completion between a breaker panel and an electrical device (e.g., appliance, switch, dimmer, etc.) enabled by the present invention eliminates the need to, among other things, twist exposed wires together and apply either wire nuts, electrical tape, solder or twist-on caps to secure those electrical connections within a housing. Typically, no more than four wires can be joined together under one twist-on cap. In fact, joining together three or more wires under one cap can, possibly, break a joined wire and result in loss of current at an outlet, light or other powered device. And tracing such a break in such a wiring joining is very time consuming and difficult.

"Junction boxes," or housings within which electrical connections are made between power sources and electrical devices, are well-known in the prior art. Historically and generally speaking, these housings have featured ports through which entry wires from a breaker panel are inserted and secured either directly to the corresponding wires of multiple electrical devices or to that of intervening wires which are, in turn, also secured to those wires leading to electrical devices. More pertinently, those connections have been secured by virtue of an electrician having to take the numerous and tedious steps of: (1) pulling supply wire cable from the breaker panel to the location of the opened junction box; (2) removing several inches of the sheath and insulation from the ends of the supply cable to expose its internal wires (for example, if using ROMEX 12-2 cable, removing the cable's outer sheath as well as the insulation surrounding the black and white wires to expose those two current-carrying wires along with the bare ground wire); (3) similarly removing sheathing and insulation from each cable leading to an electrical device; (4) inserting those exposed wires into the junction box; (5) grouping and twisting together all of the black wires (from the supply cable and the one or more device cables); (6) applying a wire nut and electrical tape or solder or twist-on cap around the twisted black wires to secure that connection; (7) grouping and twisting together all of the white wires (from the supply cable and the one or more device cables); (8) applying a wire nut and electrical tape or solder or twist-on cap around the twisted white wires to secure that connection; (9) grouping and twisting together all of the ground wires (from the supply cable and the one or more device cables); (10) pressing all such connected wiring (the volume of which is proportionate to the number of electrical device that are to be connected) inside of the junction box—typically, in at least somewhat tangled and disorderly fashion; and (12) applying a cover to or otherwise closing the junction box.

The foregoing steps take a substantial amount of time to complete, which can be quite expensive considering the hourly labor rates typically charged by skilled electricians. Moreover, splicing wires together in the foregoing fashion creates the risk that conductive material of the wires will be left exposed and, eventually, cause a short circuit or even a fire. Even further still, the more electrical connections that need to be made within a single junction box (i.e., the more electrical devices, or "powered devices," that need to be electrically connected to a power source), the more connecting wires that need to be stuffed into the box enclosure—which, at some point, either lends to a wiring mess or necessitates a physically larger box enclosure.

Consequently, the present inventor appreciates a need for a new junction box device that:

(1) renders unnecessary the expertise ordinarily required to manually splice the corresponding wires of a power supply and a powered device and, then, stuff them inside of a box enclosure in tight proximity (and, instead, permits a total novice to effectively make the same electrical connections);

(2) eliminates the potential hazard associated with such an arrangement;

(3) reduces the volume of wiring and the corresponding potential for disorganization of wires disposed within the junction box by altering the proportionality relationship between: (a) the number of electrical connections to be made within a single junction box and (b) the corresponding number of wires running within that enclosure. Instead, there is a need for a new junction box device that can contain a static number of wires situated within it, even while the number of wire cables that are electrically connected via that junction box may multiply—thereby, dramatically reducing the labor that would, otherwise, be necessary when an electrical device needs to be connected to or disconnected from the junction box and eliminating the need for a junction box housing to be physically larger in order to accommodate the wiring associated with facilitating more electrical connections.

The present invention for a pre-wired junction box with quick-connect clip electrical wire connectors substantially fulfills these needs.

SUMMARY

In its most general sense, the present invention is for a pre-wired electrical junction box that is modularly configured in a manner that eliminates the need to install internal electrical wiring proportionate to the number of electrical junctions that are to be made within the box. Although the pre-wired electrical junction box apparatus of the present invention can take on a wide variety of configurations and can have multiplicity in terms of the quantities of each of the following elements that it possesses, in its most basic sense, it is a plastic and metal assembly formed by these four primary types of elements:

(a) a non-conductive (e.g., plastic) housing enclosure;

(b) multiple (typically, 4+) ports, or sub-housings, situated within that greater housing;
(c) multiple (typically, 3+) electrically conductive push-in wire trap connectors situated within each port sub-housing; and
(d) loops of internal ground wire (1), neutral wire (1) and hot wire (1+) situated within the greater housing and running either through or closely adjacent to each port sub-housing such that each loop is in conductive contact with 2+ push-in connectors.

As mentioned, within the spirit and scope of the present invention, the number of each of the foregoing elements (a), (b) and (c) embodied in a particular junction box apparatus can vary to accommodate the number of electrical junctions that are to be made within the apparatus and under the simple principle that one port is needed per supply cable leading from a power source and into the box, and a separate one port is needed per electrical distribution cable leading out of the box to a powered device. For example, the junction box housings (element (a)) can be multiple by virtue stacking one atop another, nesting one within another or some other arrangement. For another example, as many separate ports as will physically fit within a given housing structure can be employed. A typical housing may host 4 ports (1 power supply cable port and 3 power distribution cable ports) or 8 ports (1 for power supply and 7 for power distribution), but the port quantities can greatly vary. Finally, for yet another example, the number of push-in wire connectors contained within a single port can vary, but there are, typically, 3 of them: one for receiving a supply or distribution hot wire, a second for receiving a supply or distribution neutral wire and a third for receiving a supply or distribution ground wire—where each such connector conductively connects the type of supply or distribution plugged into it with the corresponding type of looped internal wire (element (d)) stored within the housing.

In a more specific sense, the invention pertains to a pre-wired electrical junction box with push-in wire connectors housed in a non-conducting plastic receptacle body (housing) which is provided with a plurality of passageways extending from the front wall of the body through to a rear wall of the body to allow insertion of sheathed or unsheathed electrical wires. A series of black (hot), white (neutral) and green or bare (ground), three-way, push-in electrical splitters, housed as a single wiring unit, are disposed directly behind each of the passageways to constitute a port within the body.

There are three known types of push-in connectors that are distinguishable by how they operate to remove inserted wire. Flat-type push-in connectors are, typically, one-way connectors which resist removal of inserted wire. Push-type push-in connectors are, typically, two-way connectors that permit removal of inserted wire by pressing in a push pin located on top of each hot, neutral or ground connector. Lever-type push-in connectors are, typically, two-way connectors that permit removal of inserted wire by raising a lever located on top of each hot, neutral or ground connector.

The interior of the single wiring unit consists of a wire tunnel with an initial large interior diameter front opening to accommodate insulated wire. The rear of the wire tunnel is a rear opening is a smaller diameter which will allow a portion of non-insulated wire to pass into the wire plate assembly. The wire trap plate assembly is an eleven-part assembly consisting of an upper wire plate and lower wire plate, an upper connector plate, lower connector plate, rear plate, upper wire suppression plate, lower wire suppression plate, an upper spacing roll bar, lower spacing roll bar, base spacing plate and a copper alloy wire clip. The upper and lower wire plates, for connecting inserted wire, form an acute angle relative to the copper alloy upper and lower connector plates. The bottom acutely angled wire plate rests on and is attached to the end of a lower connector plate, and the top acutely angled upper wire plate sits on and is attached to the end of the bottom of an upper connector plate. The upper wire suppression plate is attached slightly behind the upper wire plate and attached to the upper connector plate, perpendicular to the rear wire plate. The lower wire suppression plate is attached slightly behind the lower wire plate and attached to the lower connector plate, perpendicular to the rear wire plate. A copper alloy rear wire wall, at a right angle to the upper connector plate and lower connector plate, rests on the lower connector plate and the upper connector plate rests on and is attached to the top of the rear plate. An upper spacing roll bar, attached to the upper connector plate slightly behind the upper wire suppression plate, works in conjunction with a lower spacing roll bar which is attached to the lower connector plate and is set slightly behind the lower wire suppression plate, to expand the space between upper wire plate and the lower wire plate to facilitate disengagement of the inserted wire when pressure is applied, by lever or push top, to the top of the upper connector plate at a point between the rear wire plate and the upper spacing roll bar. A copper alloy circular clip is attached to the exterior of the rear wall of the hot wiring assembly. A copper alloy circular clip is attached to the rear exterior of the bottom of the base spacing plate of the ground wiring assembly. A copper alloy circular clip is attached to the bottom of the front exterior of the base spacing plate of the neutral wiring assembly. This copper clips attach to copper wire which runs perpendicular to the incoming (pushed in) wire and attaches to each of the push-in connectors of its particular color orientation (red/hot, white/neutral or bare/green/ground).

The push-in connector is adapted to receive corresponding male wire contacts or posts of a particular color group such that a wire contact inserted into each of the passageways of that particular color group of push-in connectors is conductively attached to all push-in connectors of the same color orientation. In other words, all black, ground and white push-in connectors are in conductive contact with all other black, ground and white push-in connectors, respectively.

The pre-wired junction box receptacle is adapted to be mounted in electrical communication systems on flat surfaces by means of the screw plate legs connected to the body of the assembly. Because the height of the pre-wired junction box is can be minimized, space required for mounting it is minimized, and exterior surface area disruption is minimal.

Because the pre-wired junction box is capable of hosting multiple connector configurations, in different sizes, the user has the option of selecting that configuration that may fit a particular spacing requirement. The user also enjoys the flexibility of coupling multiple junction boxes to a single circuit.

According to one aspect of one embodiment of the invention, there are provided eight electrical push-in wire ports.

According to another aspect of that embodiment, there are provided four electrical push-in wire ports which are built into the reception box housing for electrical mating.

According to another aspect of the invention, there are provided slot openings for push top pins or levers to facilitate the release of inserted wire from push-in connectors.

Relative to the push-in connectors, the invention pertains, generally, to electrical push-in connectors installed within an electrical junction box to enable multiple electrical associations within that junction box. The individual push-in connector includes a unique wiring pattern connecting to a plurality of female contacts which perform contact functions with respect to the incoming copper wire from an external source. The push-in connector is, basically, a three-way splitter or a T-type connector which is a push-in connector for incoming wire and that is connected to a copper alloy circular clip which is orientated at right angles to inserted supply wire. The right-angled wire clip facilitates the attachment of perpendicular internal copper wires which connect, by clips (or soldering), to multiple other T-type push-in connectors.

The invention possesses numerous benefits and advantages over known electrical junction boxes. In particular, the invention utilizes internalized push-in connectors to allow a single supply electrical wire cable (line in) to be connected to multiple distribution wire cables (lines out) without the need for a proportionate amount of internal junction box wiring that ordinarily connects supply and distribution wires inside of a junction box. This reduces the time dedicated to connection wiring and reduces excess junction box wire, thereby, affording component placement flexibility as well as installation cost reductions. Moreover, the internalized push-in connector eliminates the need for wire nuts, tape or limitations on connections due to junction box space constraints and, therefore, diminishes assembly labor requirements and its associated costs. Because of its flexibility and simplicity in use and installation, the electrical arrangement of push-in connectors of the instant invention lends to a reduction in material costs and in the costs of junction box installation.

A practical example of the flexibility presented by the present invention concerns its ability to allow multiple distribution ports to be mounted on a single junction box in four different directions. For instance, user specifications may demand that electrical connectors be positioned on four sides of a junction box. Generally speaking, the more connectors needed, the more wiring and wiring labor necessary to provide functionality—which translates to higher assembly costs. But because the supply connector is on the exterior of the junction box, and the distribution connectors are also on the exterior of the junction box, assembly time and costs are minimized.

In addition to the foregoing attributes, the pre-wired electrical junction box of the present invention possesses numerous other electrical and mechanical benefits over conventional devices. Conventional electrical junction boxes are, typically, metal or plastic boxes with punch-out holes for inserting electrical wiring into the interior of the box to establish wiring connections. Adding additional wiring or removing expendable wiring is awkward, time consuming and expensive, as it often involves removing the junction box from a fixed location, removing taped wiring from within the junction box, untwisting and disassembling wiring, punching out an additional punch-out hole to add the new additional wire cable, stripping the additional wire cable, twisting the stripped wires together, replacing the wire nuts and re-taping the newly constructed wiring. However, with the present invention, introducing additional supply or distribution wiring to the pre-wired junction box consists of merely stripping the wire cable and pushing the stripped wires into push-in connectors without any step of disturbing the internal wire contents of the box. This allows the pre-wired electrical junction box of the present invention to tolerate more wire insertion and withdrawal cycles than conventional junction boxes, and, as previously discussed, renders irrelevant the specialized installation and maintenance protocols required by conventional electrical connectors. Moreover, the present junction box enables improved trouble-shooting times and easier isolation of troubled circuits, relative to its prior art counterparts.

DETAILED DESCRIPTION OF THE PREFERRED EMBODIMENTS

A preferred embodiment of the pre-wired electrical junction box for electrical mating, housing multiple electrical ports, each port consisting of three push-in connectors, each of which individually terminate in a soldered connection, solid connection or clip connection to a perpendicular wire, such wire connecting to similar push-in connectors which follow the same body style in all ports, employs several integrated elements including but not limited to: multiple Black Wire Trap-1A, multiple Common Wire Trap-1B and multiple White Wire Trap-1C; multiple Combined Triple Slot Lower Plastic Housing Unit-2A; multiple Housing Roof-3A; multiple Push-Top Roller Pin-3D; multiple Lever-Top Pin-3E; an Inner Junction Box Wire Clip Attachment Plate-5A, an Outer Junction Box Wire Housing-6A; a Black Concentric Insulated Wire-7A; a Common Concentric Insulated Wire-7B; a White Concentric Insulated Wire-7C; a Black Concentric Insulated Wire for 4-Port Junction Box-11A; a Common Concentric Insulated Wire for 4-Port Junction Box-11B; a White Concentric Insulated Wire for 4-Port Junction Box-11C; an Inner Junction Box Wire Clip Attachment Plate for 4-Port Junction Box-12A and an Outer Junction Box Wire Housing for 4-Port Junction Box-12B.

Figure 1A:
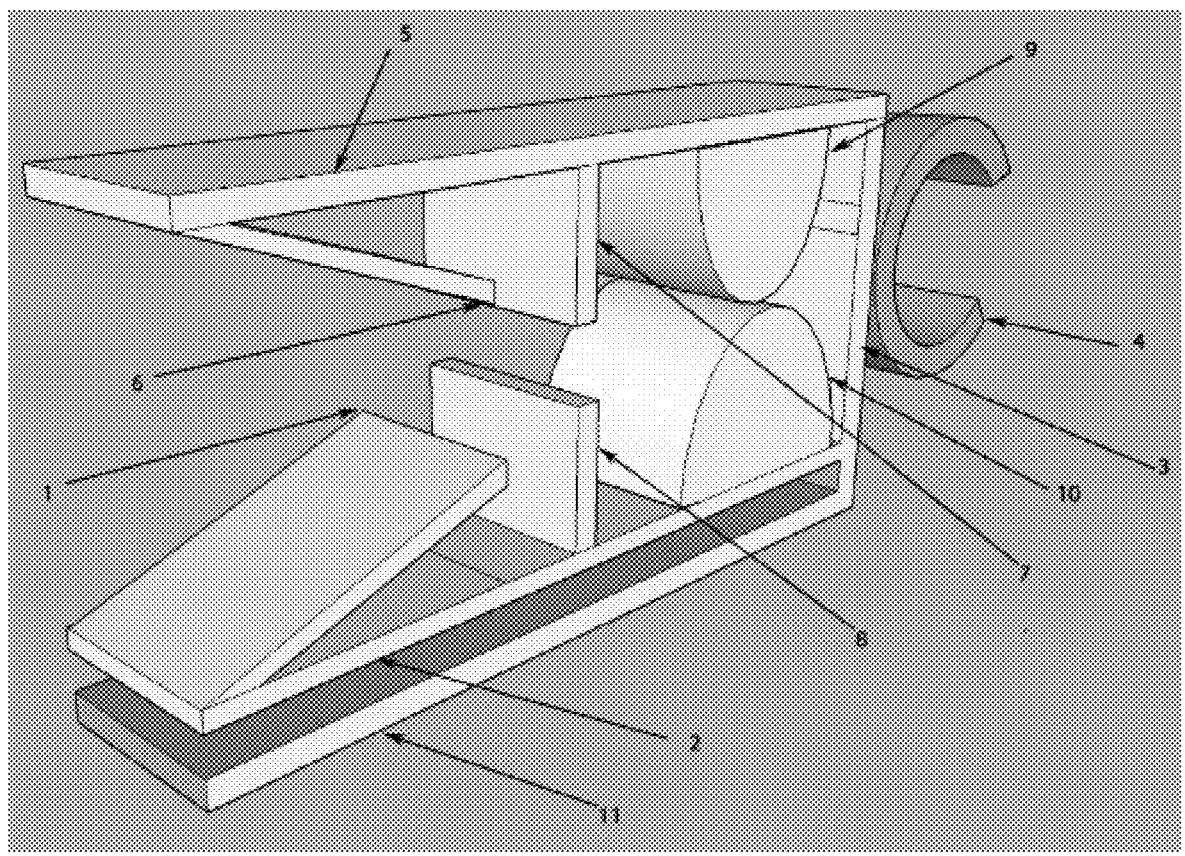
FIG. 1A is a front and side perspective view of a hot wire connector in accordance with the present disclosure—a hot wire connector which features an upper connector plate, upper wire plate, lower connector plate, lower wire plate, rear plate, upper wire suppression plate, lower wire suppression plate, upper spacing roll bar, lower spacing roll bar, base spacing plate and wire clip.

As shown in FIG. 1A, described as the Black Wire Trap, the circular wire clip-4, which is used to connect to Black insulated wiring-7A, is attached to the rear wire wall-3. The rear wire wall-3 is attached to the upper connector plate-5 and lower connector plate-2 and base spacing plate-11. The upper connector plate-5 is connected to the upper spacing roll bar-9, upper wire suppression plate-7 and the upper ridged wire plate-6. The lower connector plate-2 is connected to the lower spacing roll bar-10, the lower wire suppression plate-8 and the lower ridged wire plate-1. The upper spacing roll bar-9 works in conjunction with the lower spacing roll bar-10 so when the upper connector plate-5 is depressed, the upper spacing roll bar-9 will exert pressure on the lower spacing roll bar-10 depressing the lower wire plate-1 to facilitate the release of inserted wire. The upper wire connector plate-5, when depressed, will be forced will expend pressure against a fulcrum bar to force the upper wire plate-6 to expand, facilitating the release of inserted wire. The upper wire suppression plate-7 works in conjunction with the lower wire suppression plate-8 to limit the length of inserted wire and to assist in the release of inserted wire when the upper connector plate-5 is depressed. The base spacing plate-11 provides room for expansion of the lower connector plate-2 and is used to attach and connect White and Common wiring clips.

Figure 1B:
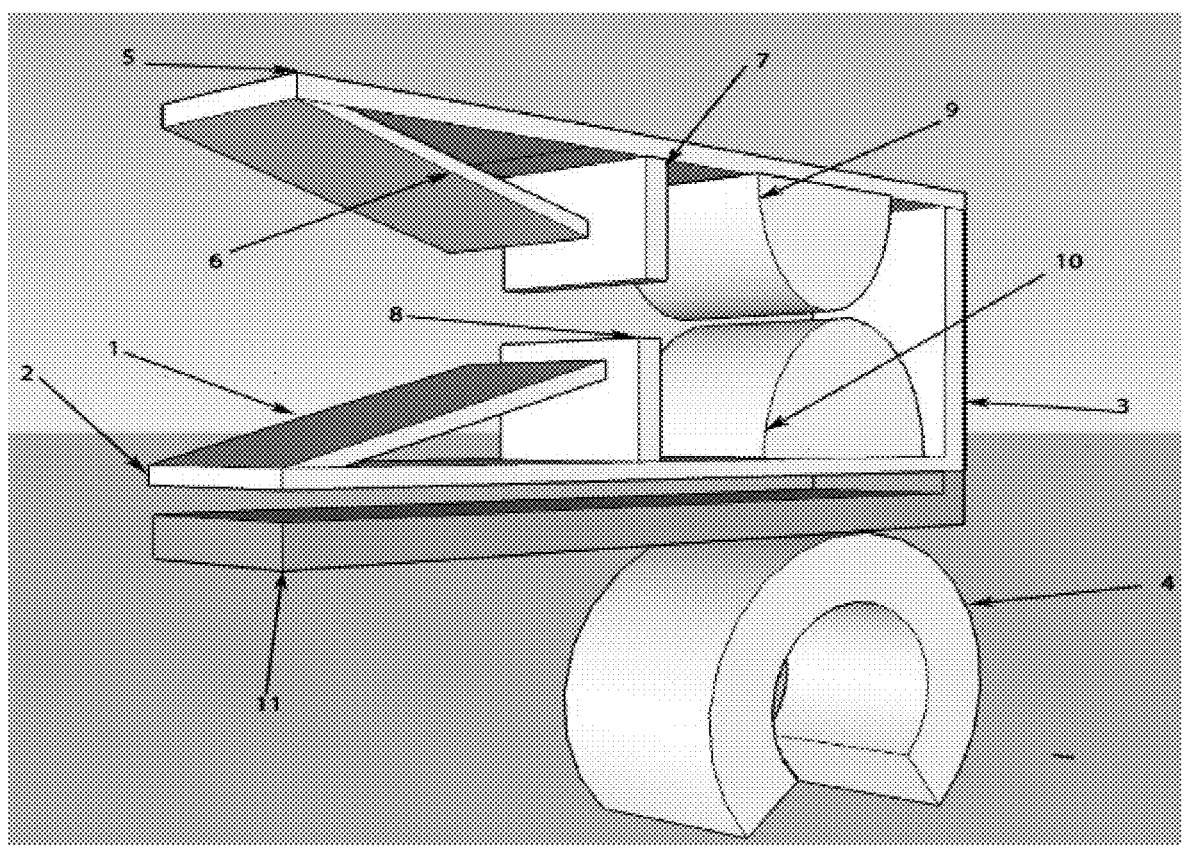
FIG. 1B is a front and side perspective view of a ground wire connector in accordance with the present disclosure—a ground wire connector which features an upper connector plate, upper wire plate, lower connector plate, lower wire plate, rear plate, upper wire suppression plate, lower wire suppression plate, upper spacing roll bar, lower spacing roll bar, base spacing plate and wire clip.

As shown in FIG. 1B, described as the Common Wire Trap, the circular wire clip-4, which is used to connect to Common insulated wiring-7B, is attached to the rear end of the base spacing plate-11. The rear wire wall-3 is attached to the upper connector plate-5 and lower connector plate-2 and base spacing plate-11. The upper connector plate-5 is connected to the upper spacing roll bar-9, upper wire suppression plate-7 and the upper ridged wire plate-6. The lower connector plate-2 is connected to the lower spacing roll bar-10, the lower wire suppression plate-8 and the lower ridged wire plate-1. The upper spacing roll bar-9 works in conjunction with the lower spacing roll bar-10 so when the upper connector plate-5 is depressed, the upper spacing roll bar-9 will exert pressure on the lower spacing roll bar-10 depressing the lower wire plate-1 to facilitate the release of inserted wire. The upper wire connector plate-5, when depressed, will be forced will expend pressure against a fulcrum bar to force the upper wire plate-6 to expand, facilitating the release of inserted wire. The upper wire suppression plate-7 works in conjunction with the lower wire suppression plate-8 to limit the length of inserted wire and to assist in the release of inserted wire when the upper connector plate-5 is depressed.

Figure 1C:
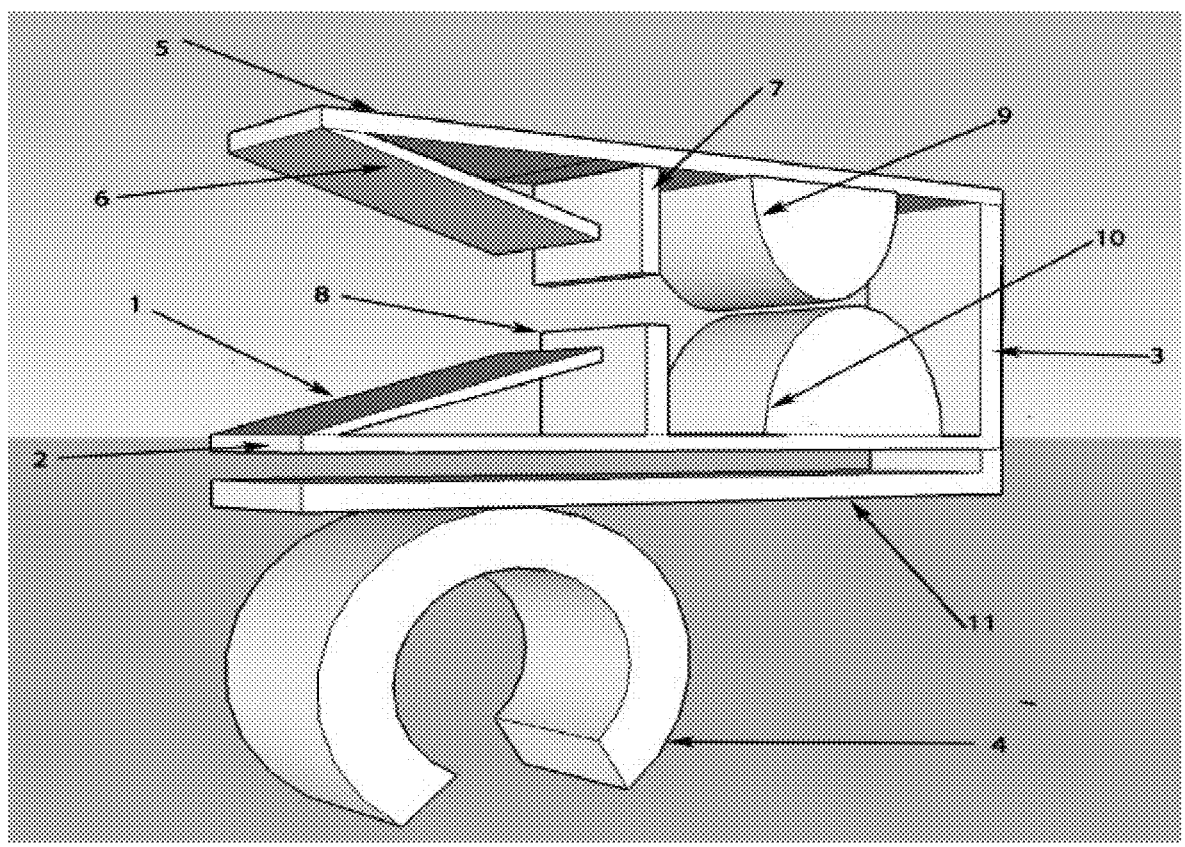
FIG. 1C is a front and side perspective view of a neutral wire connector in accordance with the present disclosure—a neutral wire connector which features an upper connector plate, upper wire plate, lower connector plate, lower wire plate, rear plate, upper wire suppression plate, lower wire suppression plate, upper spacing roll bar, lower spacing roll bar, base spacing plate and wire clip.

As shown in FIG. 1C, described as the White Wire Trap, the circular wire clip-4, which is used to connect to Common (white?) insulated wiring-7C, is attached to the front end of the base spacing plate-11. The rear wire wall-3 is attached to the upper connector plate-5 and lower connector plate-2 and base spacing plate-11. The upper connector plate-5 is connected to the upper spacing roll bar-9, upper wire suppression plate-7 and the upper ridged wire plate-6. The lower connector plate-2 is connected to the lower spacing roll bar-10, the lower wire suppression plate-8 and the lower ridged wire plate-1. The upper spacing roll bar-9 works in conjunction with the lower spacing roll bar-10 so when the upper connector plate-5 is depressed, the upper spacing roll bar-9 will exert pressure on the lower spacing roll bar-10 depressing the lower wire plate-1 to facilitate the release of inserted wire. The upper wire connector plate-5, when depressed, will be forced will expend pressure against a fulcrum bar to force the upper wire plate-6 to expand, facilitating the release of inserted wire. The upper wire suppression plate-7 works in conjunction with the lower wire suppression plate-8 to limit the length of inserted wire and to assist in the release of inserted wire when the upper connector plate-5 is depressed.

From viewing FIG. 2A-FIG. 2E, it can be understood that the Combined Triple Slot Lower Plastic Housing Unit is designed to accommodate the Black Wire Trap-1A, Common Wire Trap-1B and White Wire Trap-1C in specific positions. As designed, the Combined Triple Slot Lower Plastic Housing Unit is comprised of a front wire tunnel section hosting Black Wire Tunnel-3, Common Wire Tunnel-2 and White Wire Tunnel-1, such front section connected to Right Housing Wall-4, Left Housing Wall-10, Black/Common Wall-7, which separates Black Slot-26 from Common Slot-26A, and Common/White Wall-7A, which separates Common Slot-26A from White Slot-26B, such walls connected to the Rear Housing Wall-9 and all of the aforementioned walls rest on the Bottom Housing Unit Wall-27. The Right Housing Wall-4 hosts a Right Roof Attachment Slot-6, a Right Wall Fulcrum Hole-23 and a Housing Attachment Protrusion-5 which is used to attach the Housing Unit to the Inner Junction Box Wire Clip Attachment Plate-FIG. 5A or FIG. 12A. The Left Housing Wall-10 hosts a Left Roof Attachment Slot-11, a Left Wall Fulcrum Hole-23C and a Housing Attachment Slot-12 which is used to attach the Housing Unit to the Inner Junction Box Wire Clip Attachment Plate-FIG. 5A or FIG. 12A. The Rear Wall-9 has a Rear Wall Opening-8 to allow the Wire Clip-4 of the Black Wire Trap-1A to protrude. The Bottom Housing Unit Wall-27 hosts the Common Bottom Plate Opening-13 which allows the Wire Clip-4 of the Common Wire Trap-1B to protrude from the Bottom of the Bottom Housing Unit Wall-27. The Bottom Housing Unit Wall-27 also hosts the White Bottom Plate Opening-15 which allow the Wire Clip-4 of the White Wire Trap-1C to protrude from the Bottom of the Bottom Housing Unit Wall-27. Wire Clip-4 of the White Wire Trap-1C and Wire Clip-4 of the Common Wire Trap-1B are separated by a Clip Separation Wall-14 on the bottom of the lower plastic housing unit. Black Wire Trap-1A is placed in Black Wire Slot-26, between the Black Right Spacing Wall-17 and Black Left Spacing Wall-18, and aligns with the rear diameter opening of Black Wire Tunnel-3, Common Wire Trap-1B is placed in Common Wire Slot-26A, between the Common Right Spacing Wall-19 and Common Left Spacing Wall-20, and aligns with the rear diameter opening of Common Wire Tunnel-2 and White Wire Trap-1C is placed in White Wire Slot-26B, between the White Right Spacing Wall-21 and White Left Spacing Wall-22, and aligns with the rear diameter opening of White Wire Tunnel-1 and then the fulcrum bar-25 is inserted through Right Wall Fulcrum Hole-23, Black/Common Wall Fulcrum hole-23A, Common/White Fulcrum Hole 23B and Left Wall Fulcrum Hole-23C. Wire Clip-4 on the Black Wire Trap-1A projects out from the rear wall opening-8, Wire Clip-4 on the Common Wire Trap-1B projects out Common Bottom Plate Opening-13 and Wire Clip-4 on the White Wire Clip-1C projects out of the White Bottom Plate Opening-15 of the lower plastic housing unit. Wire Clip-4 of the White Wire Trap-1C and Wire Clip-4 of the Common Wire Trap-1B are separated by a Clip Separation Wall-14 on the bottom of the lower plastic housing unit. White Wire Tunnel-1, which leads to White Wire Slot-26B allows white wire to be inserted into the White Wire Trap-1C. Common Wire Tunnel-2, which leads to Common Wire Slot-26A allows common wire to be inserted into the Common Wire Trap-1B. Black Wire Tunnel-3, which leads to Black Wire Slot-26 allows black wire to be inserted into the Black Wire Trap-1A. The Outside Diameter-3 of the Black Wire Tunnel-3, is large enough to accommodate insulated wire and the Rear Diameter-3A of the Black Wire Tunnel-3 is smaller and will only allow uninsulated wire to be passed, which is reflected in Common Wire Tunnel-2 and the Black Wire Tunnel-3. The upper interior wall of Right Housing Wall-4 host Lever/Push-Top Slot-24C and the upper interior wall of the Left Housing Wall-10 host Lever/Push-Top Slot-24. Correspondingly the Black/Common Wall-7 hosts Lever/Push-Top Slot-24D on the left wall and host Lever/Push-Top Slot-24B on the right wall and Common/White Wall-7A hosts Lever/Push-Top Slot-24E on the left wall and host Lever/Push-Top Slot-24A on the right wall. The Lever/Push-Top Slots are used to host the insertion and movement of Push-Top Pin-3D or Lever-Top-3E.

Figure 2A:
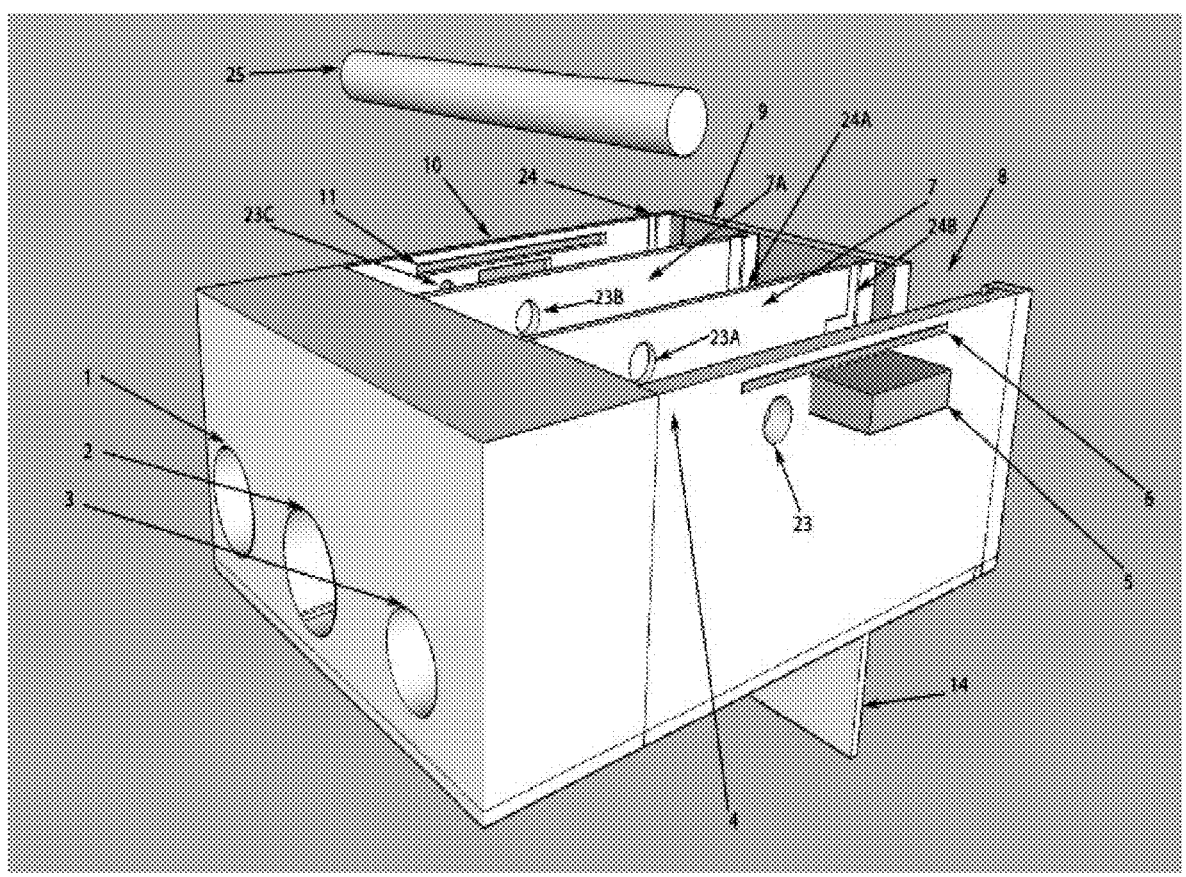
FIG. 2A is a right and front perspective view of a port sub-housing for wire connectors in accordance with the present disclosure.
Figure 2B:
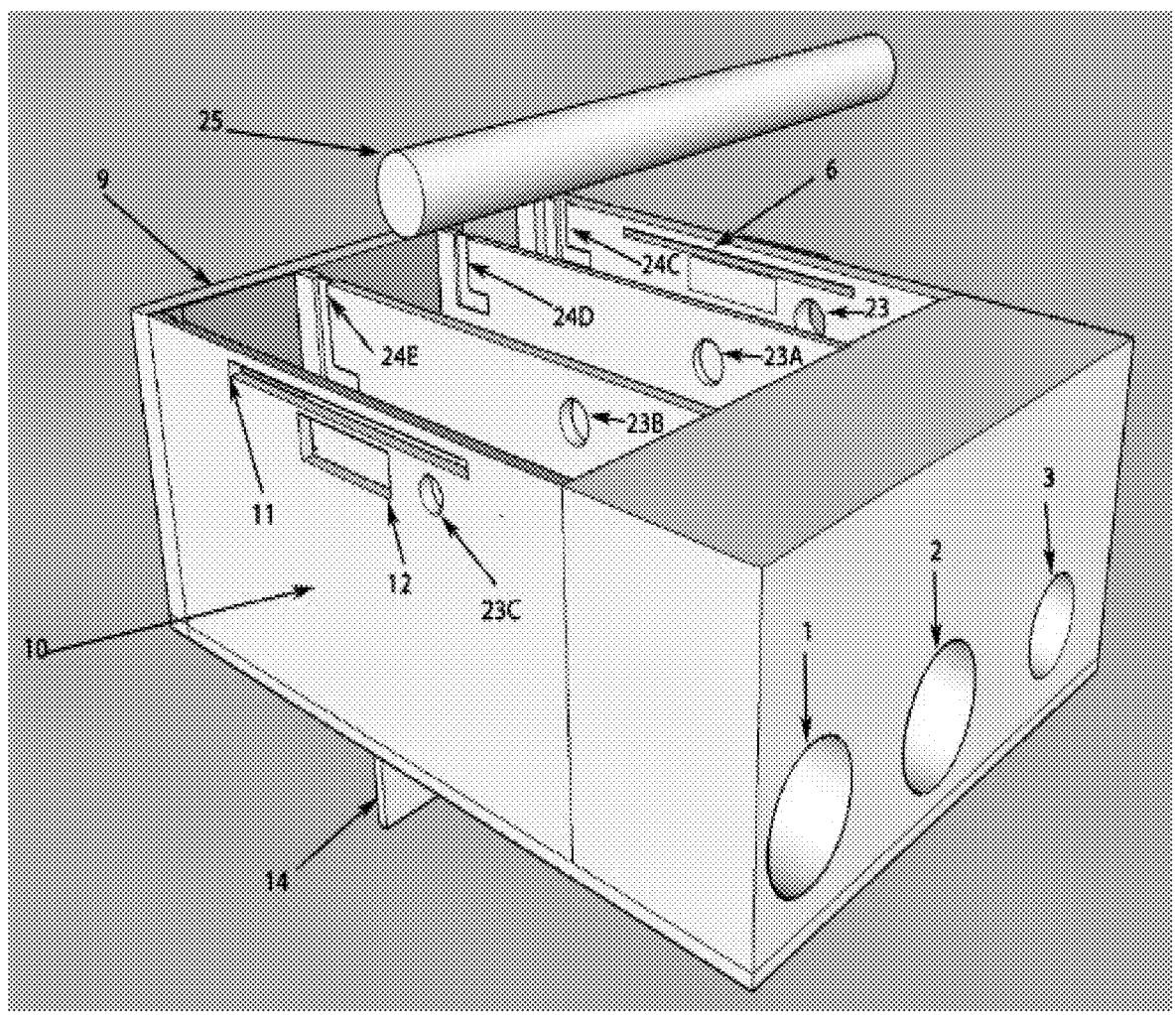
FIG. 2B is a left and front perspective view of the same.
Figure 2C:
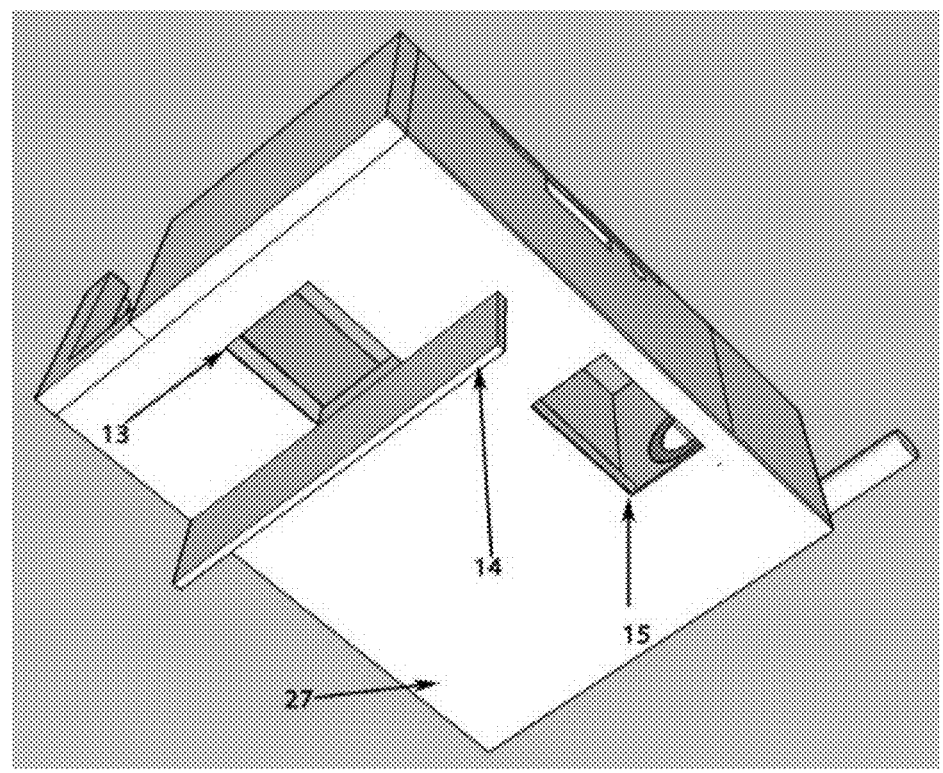
FIG. 2C is a bottom perspective view of the same.
Figure 2D:
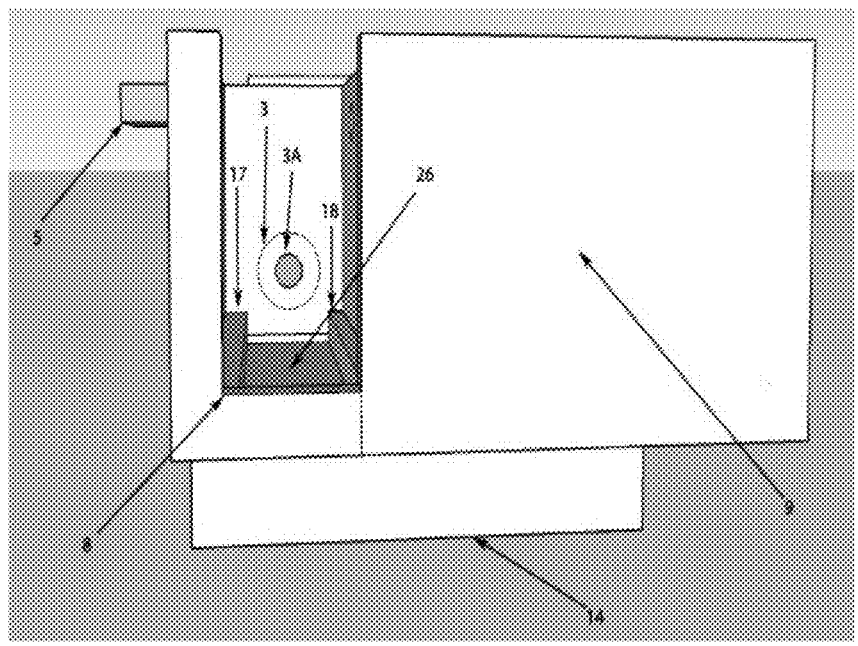
FIG. 2D is another bottom perspective view of the same.
Figure 2E:
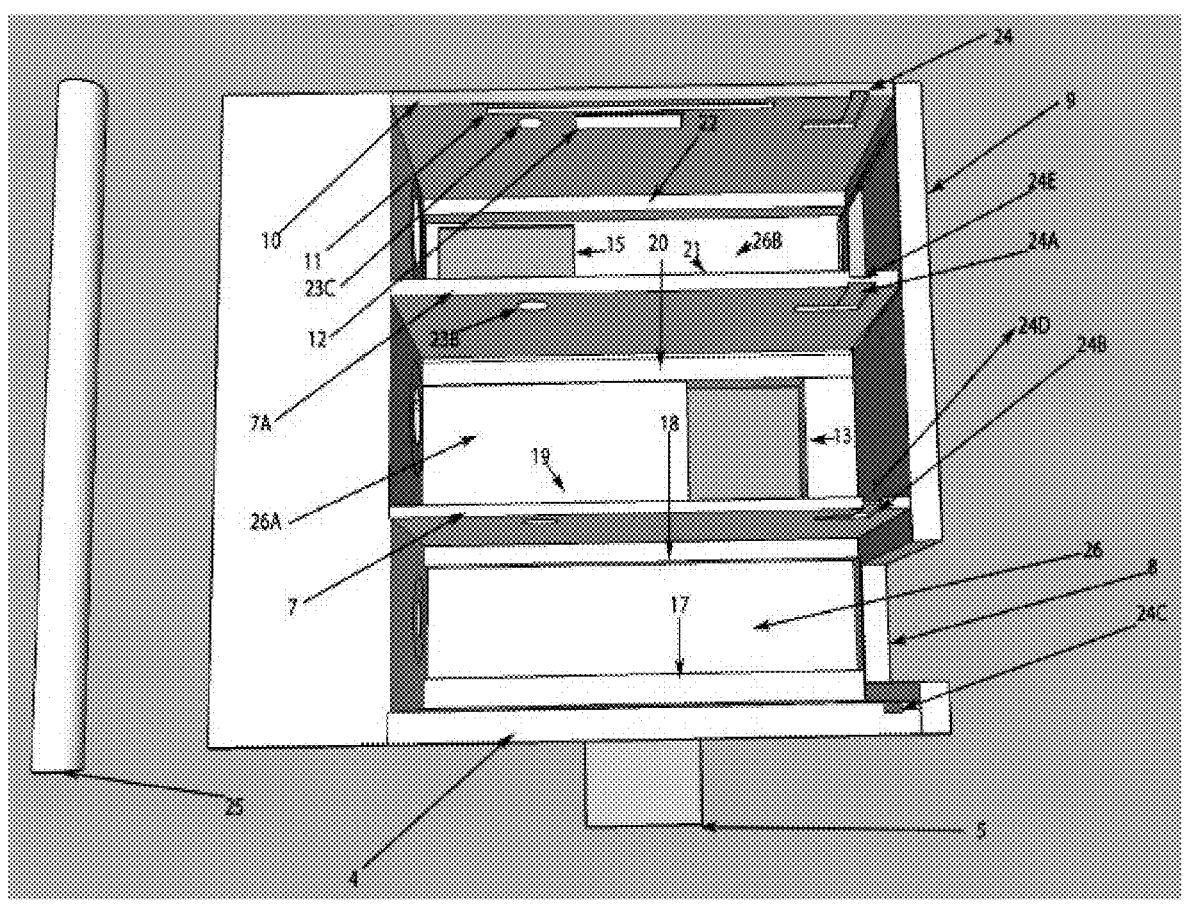
FIG. 2E is a top perspective view of the same.
Figure 3A:
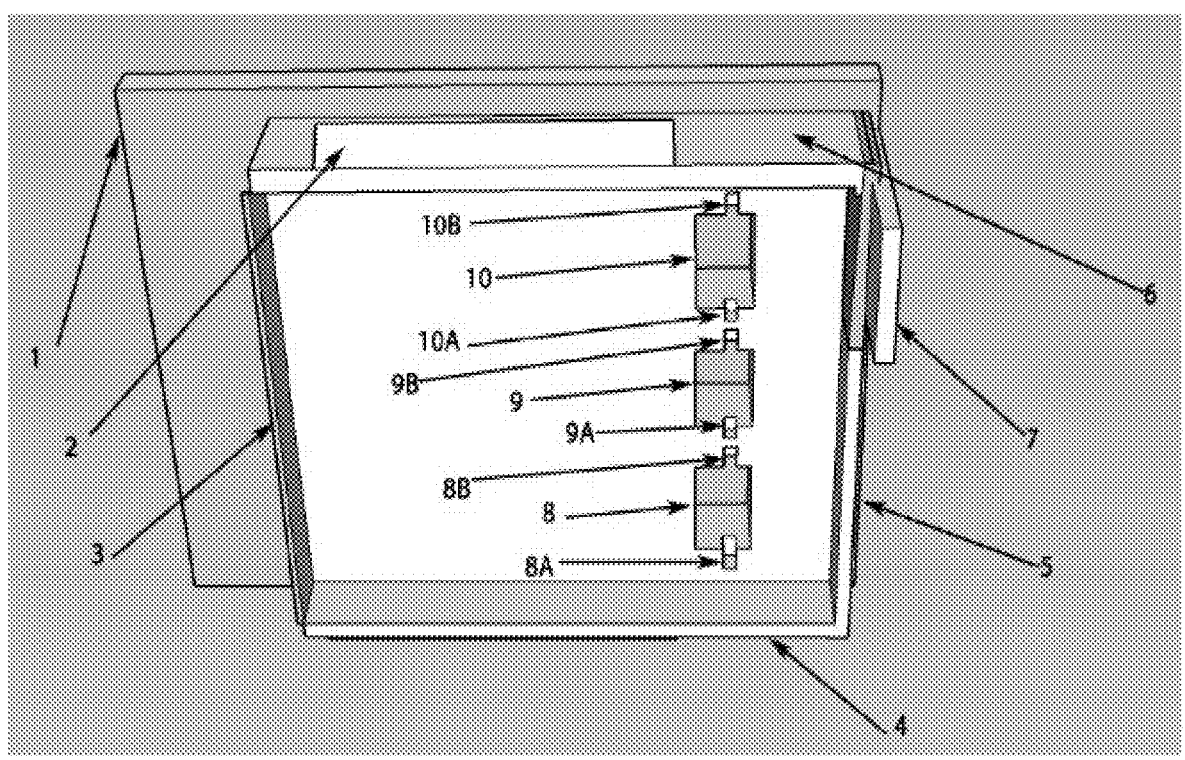
FIG. 3A is a bottom, right perspective view of the roof component of a port sub-housing for wire connectors in accordance with the present disclosure.
Figure 3B:
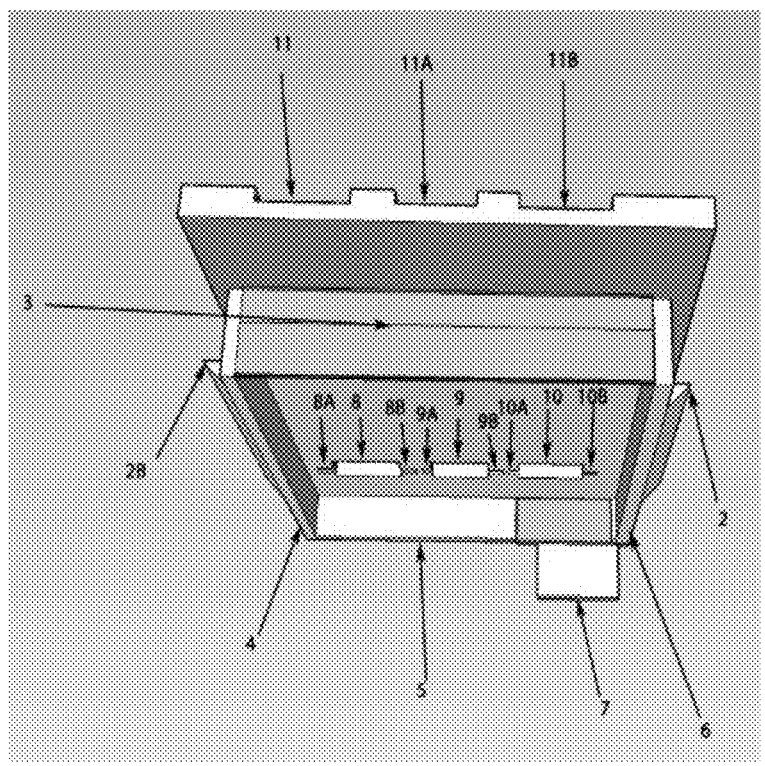
FIG. 3B is a bottom, front perspective view of the same.
Figure 3C:
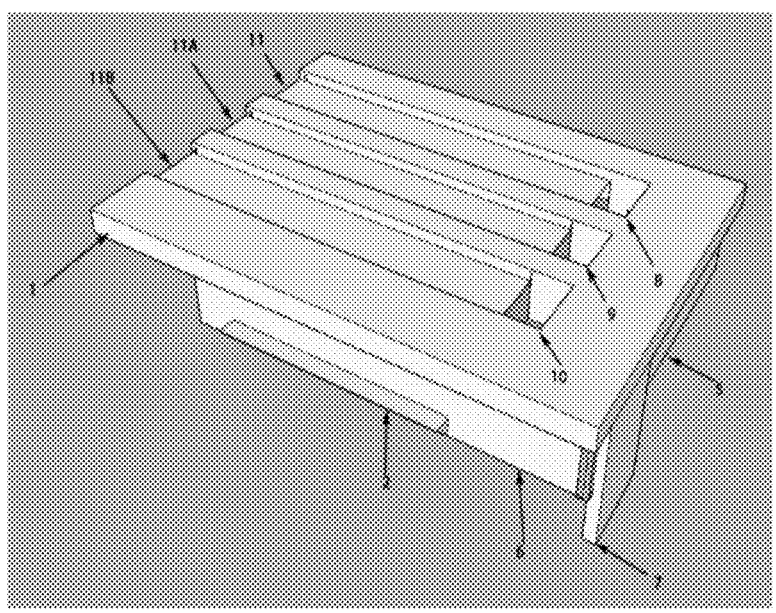
FIG. 3C is a top, rear and right perspective view of the same.

The Roofing, Lever-Top and Push-Top for completing the assembly of the Combined Triple Slot Unit lower plastic housing unit-FIG. 2A are described in FIG. 3A-FIG. 3E. FIG. 3A is a side view of the Roof Attachment. The Roof Body-1 which has three openings, Black Roof Slot-10, which has Black Pin Slot-10A and Black Pin Slot-10B on each side to accommodate Push-Top-3D or Lever-Top-3E, Common Roof Slot-9, which has Common Pin Slot-10A and Common Pin Slot-10B on each side to accommodate Push-Top-3D or Lever-Top-3E, and White Roof Slot-8, which has White Pin Slot-10A and White Pin Slot-10B on each side to accommodate Push-Top-3D or Lever-Top-3E. Attached to the Roof Body-1 are Right Roof Wall-6 which has Housing Attachment Protrusion-2 attached, Rear Roof Wall-5 which has Black Rear Slot Cover-7 attached to accommodate and partially cover the Rear Wall Opening-8 on Rear Housing Wall-9, Left Roof Wall-4 which has Housing Attachment Protrusion-2A attached and Front Roof Wall-3. The roof walls are all slightly recessed from the edge of the Roof Body-1 to accommodate insertion into the Combined Triple Slot Lower Plastic Housing Unit. As shown in FIG. 3B, the top of the Roof Body-1 is inlaid with Black Lever Slot-11B which terminates in Black Roof Slot-10, Common Lever Slot-11A which terminates in Common Roof Slot-9 and White Lever Slot-11 which terminates in White Roof Slot-8. Black Lever Slot-11B, Common Lever Slot-11A and White Lever Slot-11 accommodate Lever-Top 3E in a closed position. Each slot had slight depressions at the front of the slot to lock the lever into a fixed position when the lever is in a closed position.

Figure 3D:
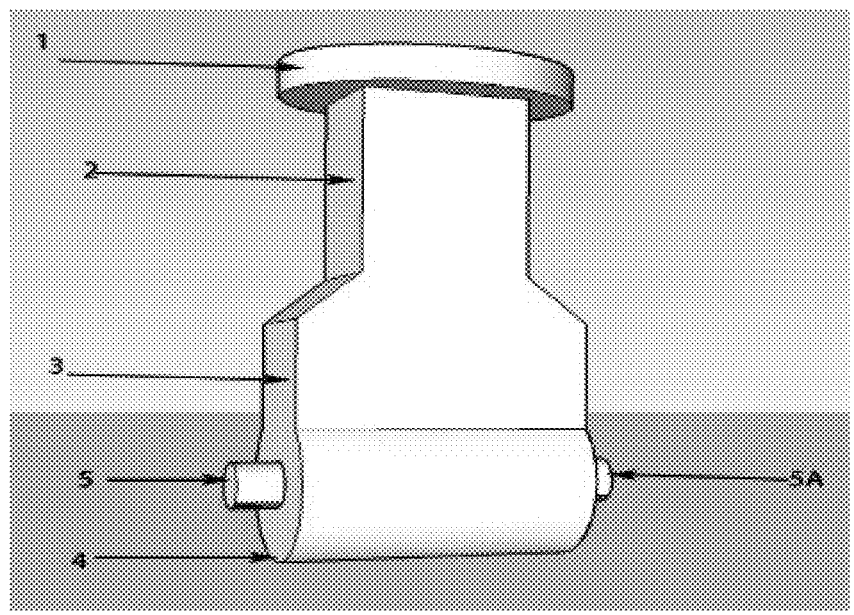
FIG. 3D is a side perspective view of the push pin component of a push-type wire connector of the present disclosure.

The Push-Top Pin as described in FIG. 3D is comprised of Push-Top Cap-1, Push-Top Shank-2, Push-Top Body-3, Push Top Roller Pin-4 and Push-Top Left Roof Pin-5 and Push-Top Right Roof Pin-5A. The Push-Top Cap-1 is attached to the top of the Push-Top Shank-2 to provide an area for depressing the pin. The Push-Top Shank-2 fits in White Roof Slot-8, Common Roof Slot-9 and Black Roof Slot-10 and is attached to Push-Top Body-3. The Push-Top Body-3 fits below Roof Body-1 and attaches to Push Top Roller Pin-4 which will rest on the upper connector plate-5 of the Wire Trap Assembly and exerts pressure on the upper connector plate-5 when depressed to force open upper and lower wire plates of the Wire Trap Assembly. Push-Top Left Roof Pin-5 and Push-Top Right Roof Pin-5A are connected to both sides of the Push-Top Roller Pin-4 to facilitate and secure the up and down movement of the Push-Top assembly.

Figure 3E:
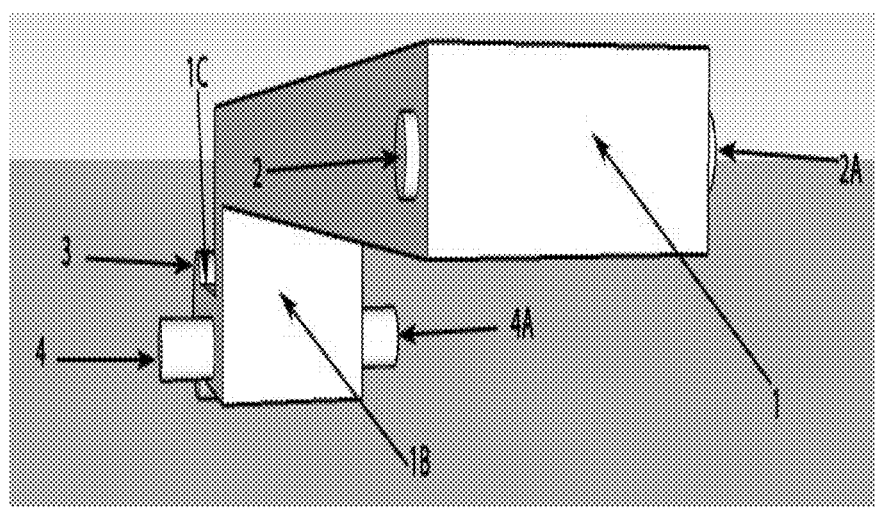
FIG. 3E is a side perspective view of the lever component of a lever-type wire connector of the present disclosure.

As depicted in FIG. 3E, the Lever-Top Pin is defined by the Lever Arm-1 which has Lever Lock Pin Left-2 and Lever Lock Pin Right-2A secured to each side to facilitate securing the Lever Arm-1 to the roof top when the lever is in a closed position. The Lever Shaft-1B, which extends perpendicular from the Lever Arm-1, lowers the Lever Rear Arm-1C and Lever Roller Body-3 below the housing roof. The Lever Roller Body-3 rests on the Upper Connector Plate of the Wire Trap and facilitates wire extraction by expansion of the wire plates when Lever Arm-1 is lifted. Lever Pivot Pin Left-4 and Lever Pivot Pin Right-4A, which reside on each side of the Lever Rear Shaft-1C are used to secure the Lever-Top Pin into the housing roof and allow the Lever Pin to pivot.

In the flat assembled configuration of the Combined Triple Slot Unit lower plastic housing unit-FIG. 2A, the housing roof is devoid of levers or Push-tops. In the Lever-Top Configuration, the housing roof hosts three Lever-Top-3E levers which raise or lower to open or close the wire trap assembly encased in the Combined Triple Slot Unit lower plastic housing unit-FIG. 2A. In the Push-Top Configuration, the housing roof hosts three Push-Top-3D pins which are depressed or released to open or close the wire trap assembly encased in the Combined Triple Slot Unit lower plastic housing unit-FIG. 2A.

Figure 4A:
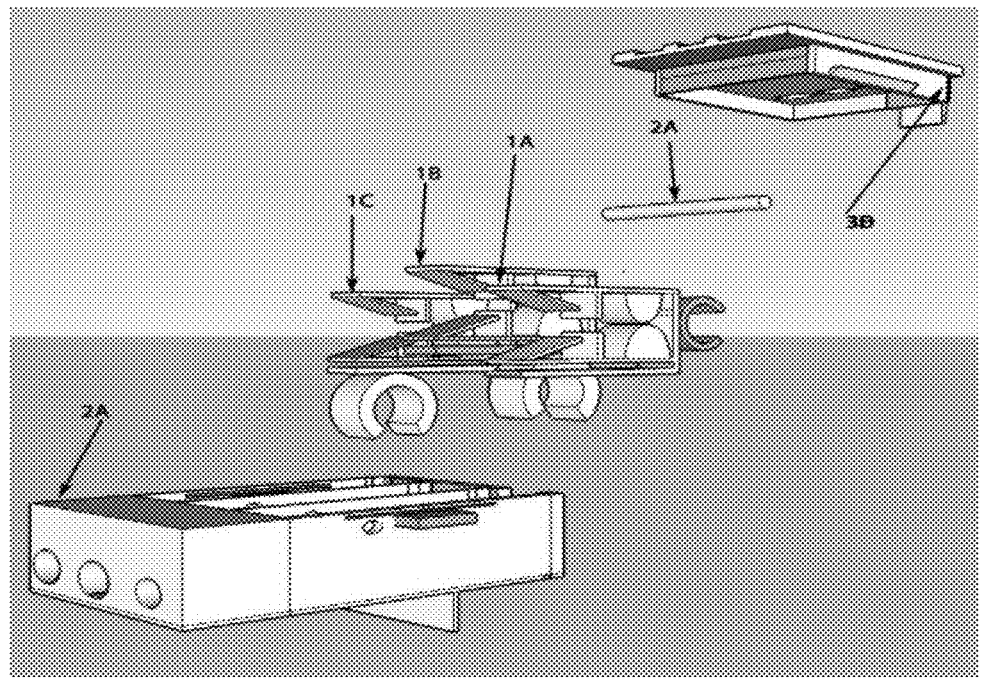
FIG. 4A is a front and right perspective view of a port sub-housing for flat-type hot, ground and neutral wire connectors in accordance with the present disclosure, the port shown in a disassembled state.

As described by FIG. 4A, the Flat-Top version of the assembled Wire Housing unit consists of Combined Triple Slot Lower Plastic Housing Unit-FIG. 2A, Black Wire Trap-FIG. 1A, Common Wire Trap-FIG. 1B, White Wire Trap-FIG. 1C and Housing Roof-3B. The completely assembled version of the Wire Housing Unit is described by FIG. 4B.

Figure 4B:
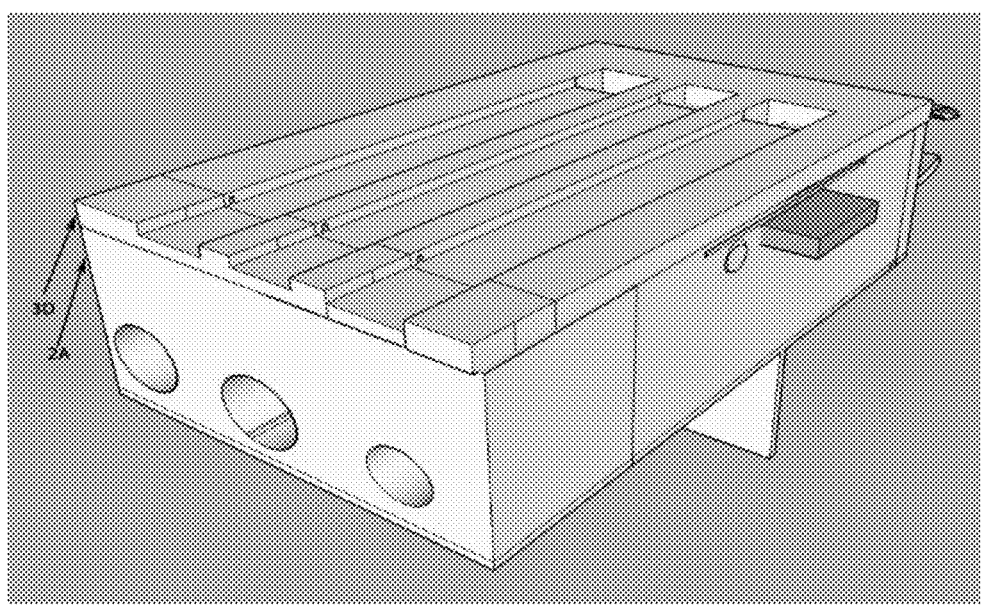
FIG. 4B is top, front and right perspective view of a port sub-housing for flat-type wire connectors in accordance with the present disclosure.
Figure 4C:
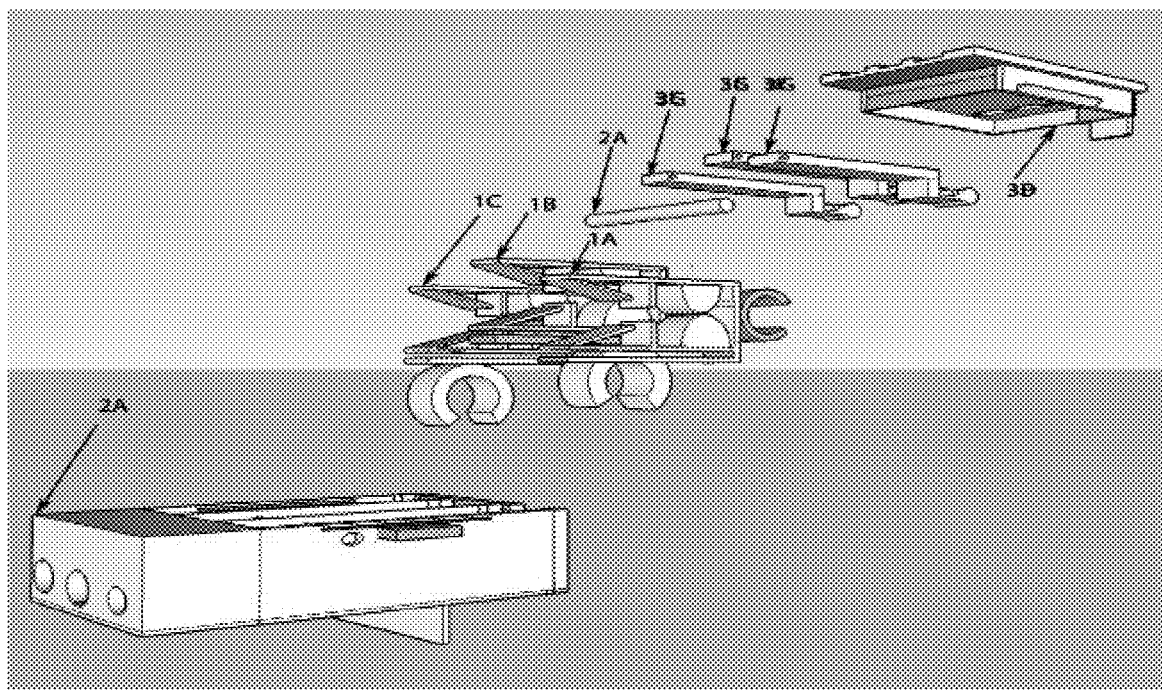
FIG. 4C is a front and right perspective view of a port sub-housing for lever-type hot, ground and neutral wire connectors in accordance with the present disclosure, the port shown in a disassembled state.

As described by FIG. 4C, the Lever-Top version of the assembled Wire Housing unit consists of Combined Triple Slot Lower Plastic Housing Unit-FIG. 2A, Black Wire Trap-FIG. 1A, Common Wire Trap-FIG. 1B, White Wire Trap-FIG. 1C, three Lever-Top-3E and Housing Roof-3B. The completely assembled version of the Wire Housing Unit is described by FIG. 4D.

Figure 4D:
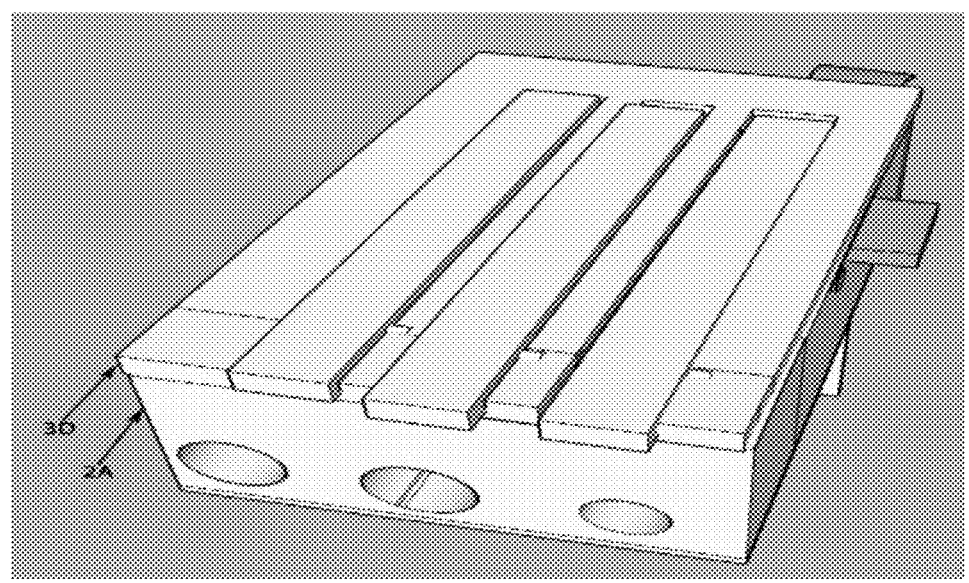
FIG. 4D is a top, front and right perspective view of a port sub-housing for lever-type wire connectors in accordance with the present disclosure.
Figure 4E:
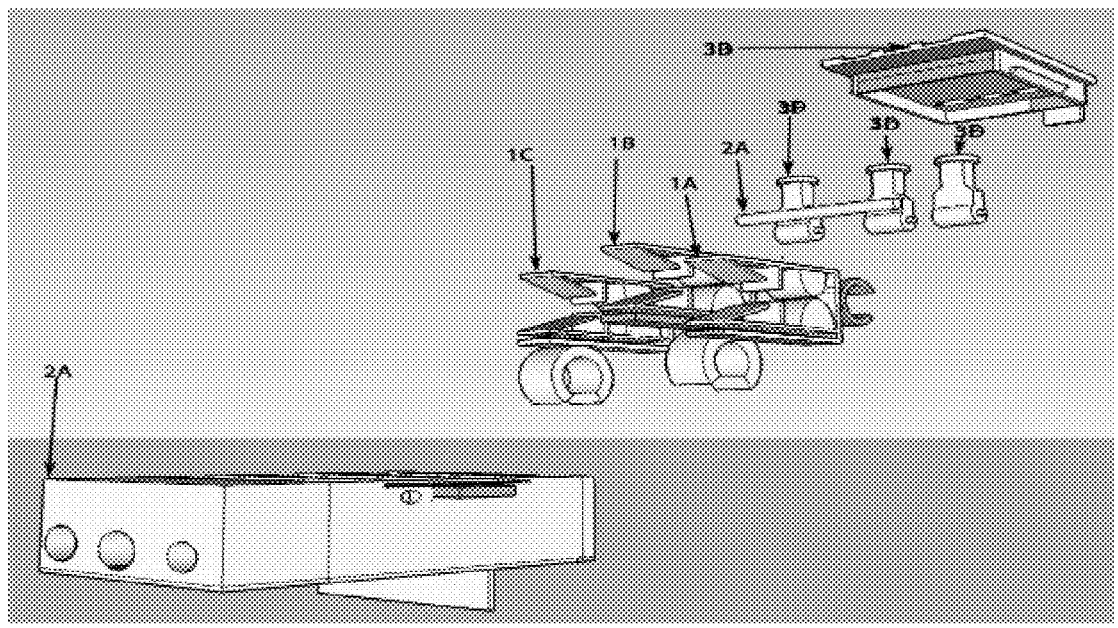
FIG. 4E is a front and right perspective view of a port sub-housing for push-type hot, ground and neutral wire connectors in accordance with the present disclosure, the port shown in a disassembled state.

As described by FIG. 4E, the Push-Top version of the assembled Wire Housing unit consists of Combined Triple Slot Lower Plastic Housing Unit-FIG. 2A, Black Wire Trap-FIG. 1A, Common Wire Trap-FIG. 1B, White Wire Trap-FIG. 1C, three Push-Top-3D and Housing Roof-3B. The completely assembled version of the Wire Housing Unit is described by FIG. 4F.

Figure 4F:
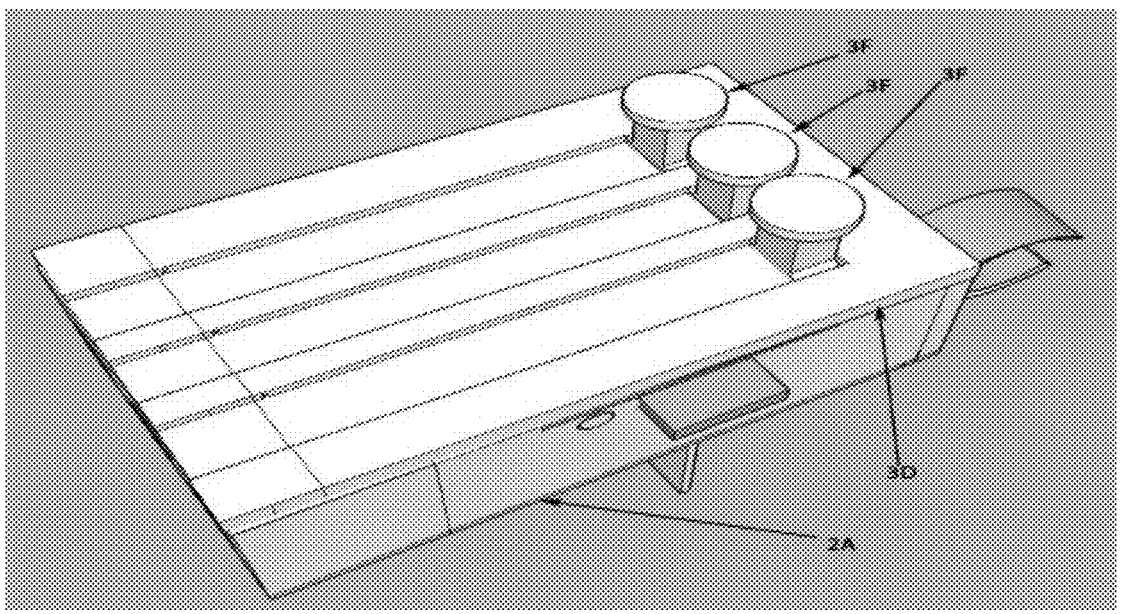
FIG. 4F is a top and right perspective view of a port sub-housing for push-type wire connectors in accordance with the present disclosure.
Figure 4G:
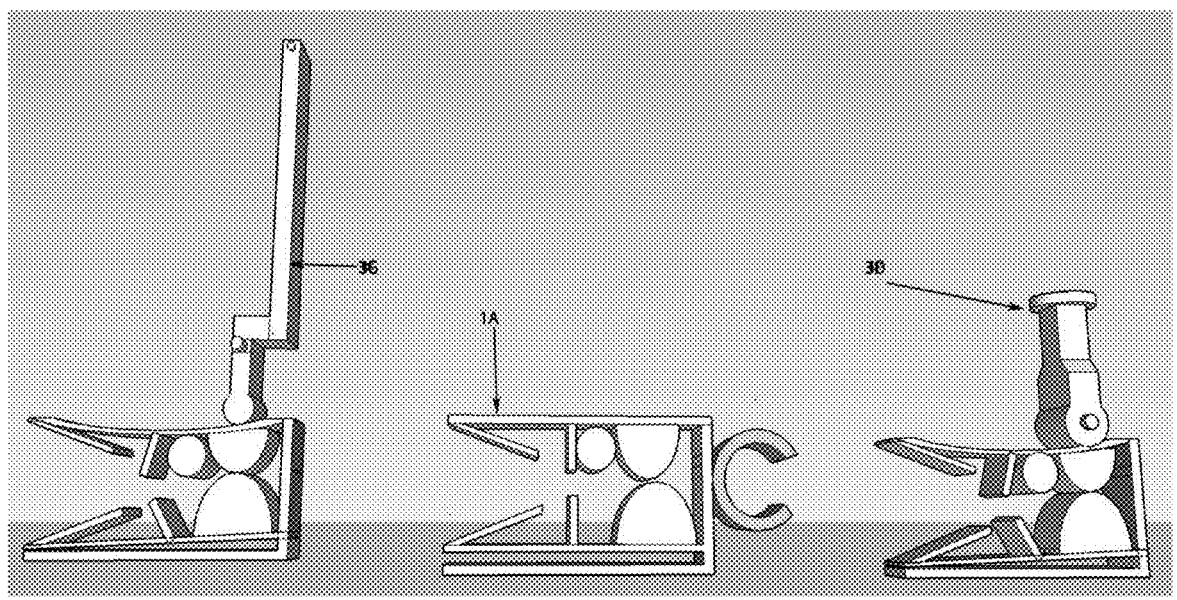
FIG. 4G is an elevational view of, from left to right, a lever type wire connector, a flat-type wire connector and a push-type wire connector in accordance with three present disclosure.

As described by FIG. 4G, the Wire Trap is shown when the lever or push-top is in an open position or closed position.

Figure 5A:
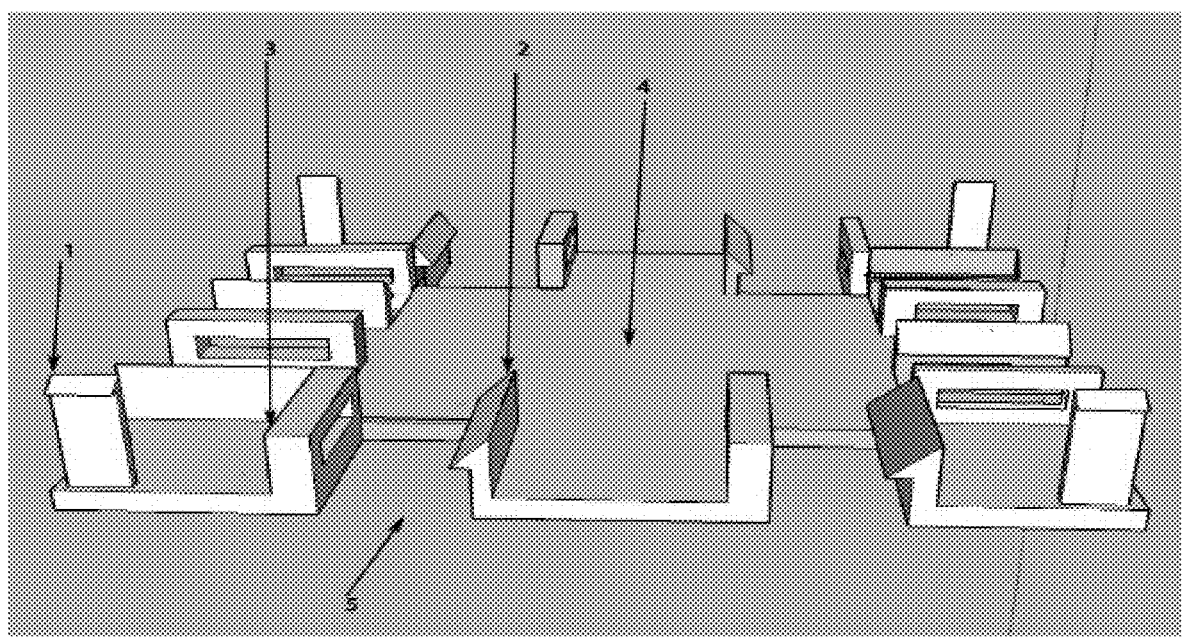
FIG. 5A is a top perspective view of a connector attachment plate for an 8-port junction box in accordance with the present disclosure.

As depicted in FIG. 5A, Inner Junction Box Wire Clip Attachment Plate is a four-part assembly comprised of the Plate Body-4, outer body attachment clip-1, wire housing attachment slot-3 and wire housing attachment protrusion-2. Wire Housing Attachment Slot-3 and Wire Housing Attachment Protrusion-2 are separated by an open space Clip Insertion Slot-5. Clip Insertion Slot-5 allows the Wire Trap Assembly to be placed so that the roof of the Wire Trap Assembly is above the body of Plate Body-4 to allow access to Lever or Push Tops. Attached to and perpendicular to the plate body-4, are four outer body attachment clips-1. Attached to the front of outer body attachment clip-1, is the acutely angled clip, which allow the plate body-4 to be attached to Outer Junction Box Wire Housing-6A. Attached to, at the front edge and perpendicular to the bottom of Plate Body-4, are wire housing attachment protrusion-2 and wire housing attachment slot-3. The acutely angled wire housing attachment protrusion-2 allows attachment to the assembled wire clip assembly. The body of the wire housing attachment slot-3 will accommodate the assembled wire clip assembly housing attachment protrusion-12. The spacing between the wire housing attachment slot-3 and the wire housing attachment protrusion-2, described as Clip Insertion Slot-5, is the width and length of the wire housing body. The wire housing attachment slot-3 and the wire housing attachment protrusion-2 are paired as single units, referred to as housing clip arrangements. For the eight port electrical junction box, there are eight housing clip arrangements, two such arrangement per each side of Plate Body-4. The total width of two housing clip arrangements will accommodate the assembled wire clip assembly. The two housing clip arrangements are centered on each side of plate body-4.

Figure 5B:
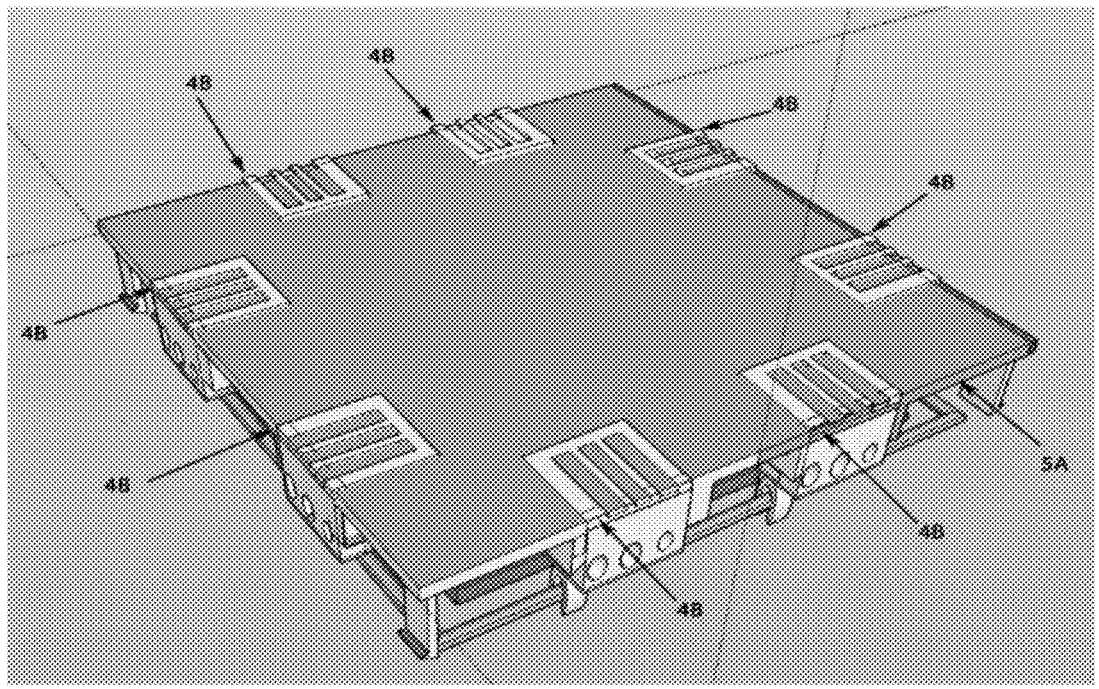
FIG. 5B is a top perspective view of an 8-port inner junction box with flat-type wire connectors in accordance with the present disclosure.

As described by FIG. 5B, eight assembled Wire Housing Unit with Flat-Top-FIG. 4B, are inserted into the Inner Junction Box Wire Clip Attachment Plate-FIG. 5A in the Clip Insertion Slots-5.

Figure 5C:
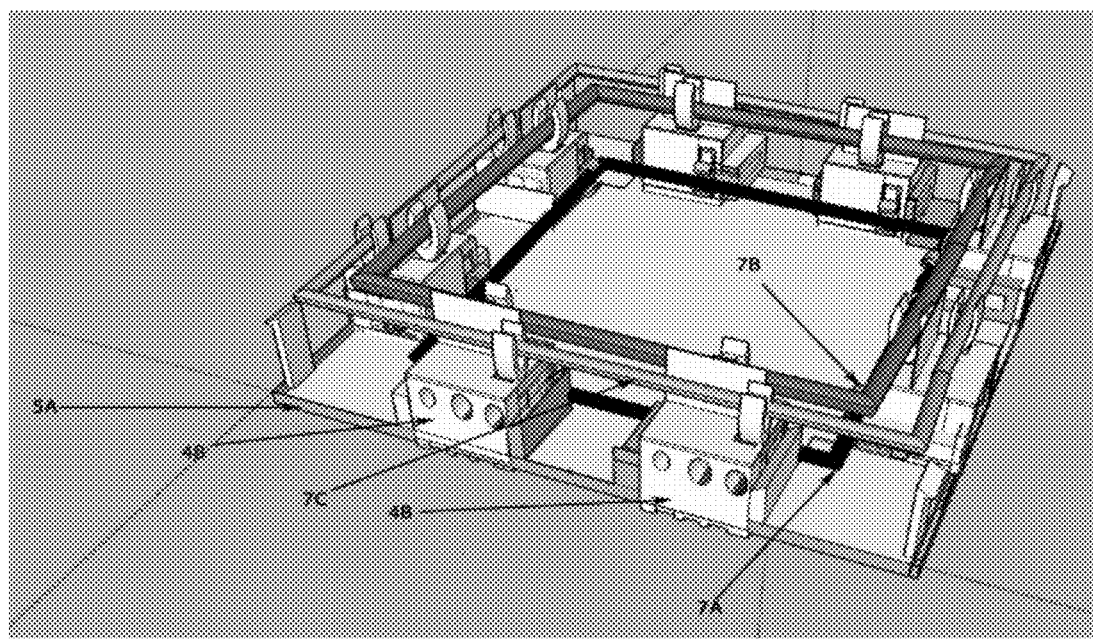
FIG. 5C is a bottom perspective view of an 8-port inner junction box with port sub-housings and insulated wire connectors.

As described by FIG. 5C, labeled Flat-Top Inner Junction Box Assembled, eight assembled Wire Housing Unit with Flat-Top-FIG. 4B, are inserted into the Inner Junction Box Wire Clip Attachment Plate-FIG. 5A in the Clip Insertion Slots-5. The Black Wire Clips on the eight assembled Wire Housing Units are connected by Black Concentric Insulated Wire-7A, the Common Wire Clips are connected by the Common Concentric Insulated Wire-7B and the White Wire Clips are connected by the White Concentric Insulated Wire-7C.

Figure 5D:
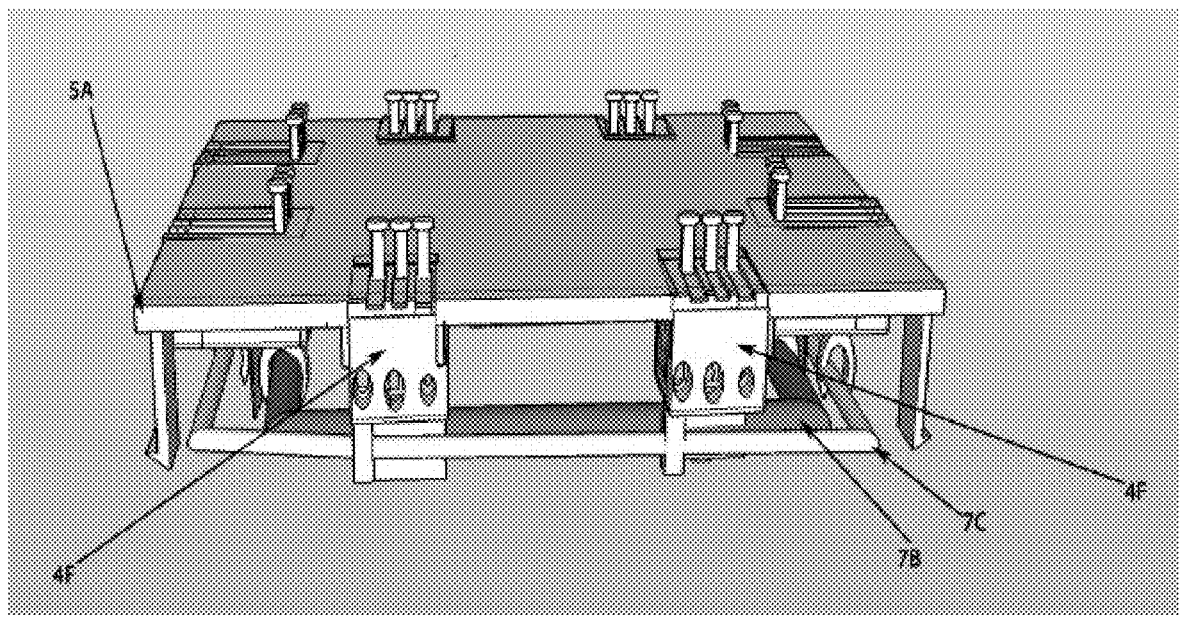
FIG. 5D is a top perspective view of an 8-port inner junction box with port sub-housings and push-type wire connectors in accordance with the present disclosure.

As described by FIG. 5D, eight assembled Wire Housing Unit with Push-Top-FIG. 4F, are inserted into the Inner Junction Box Wire Clip Attachment Plate-FIG. 5A in the Clip Insertion Slots-5.

Figure 5E:
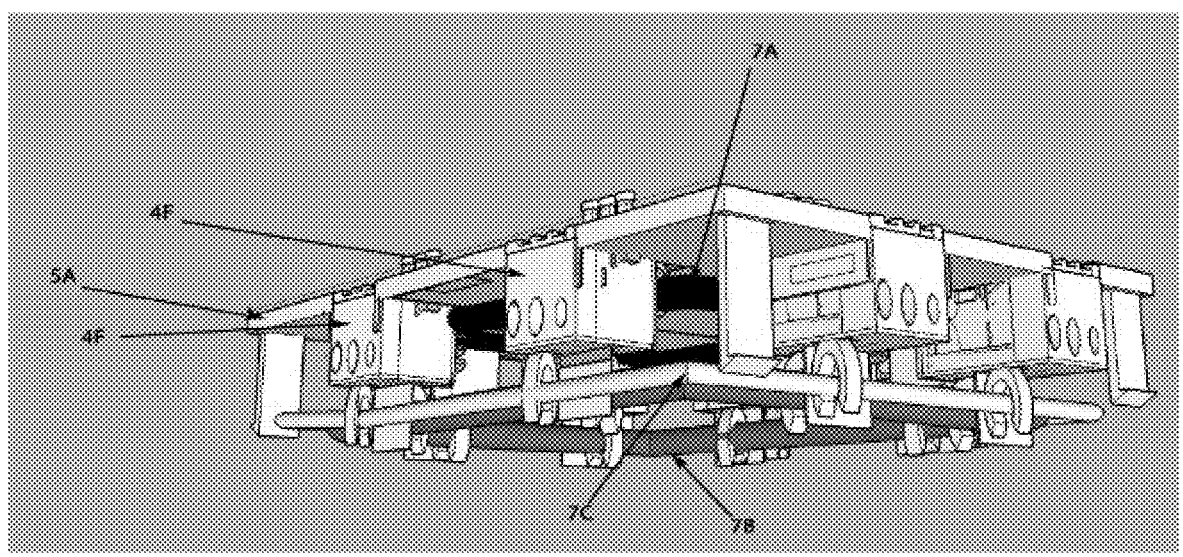
FIG. 5E is a bottom perspective view of the same.

As described by FIG. 5E, labeled Push-Top Inner Junction Box Assembled, eight assembled Wire Housing Unit with Push-Top-FIG. 4F, are inserted into the Inner Junction Box Wire Clip Attachment Plate-FIG. 5A in the Clip Insertion Slots-5. The Black Wire Clips on the eight assembled Wire Housing Units are connected by Black Concentric Insulated Wire-7A, the Common Wire Clips are connected by the Common Concentric Insulated Wire-7B and the White Wire Clips are connected by the White Concentric Insulated Wire-7C.

Figures 5F, 5G:
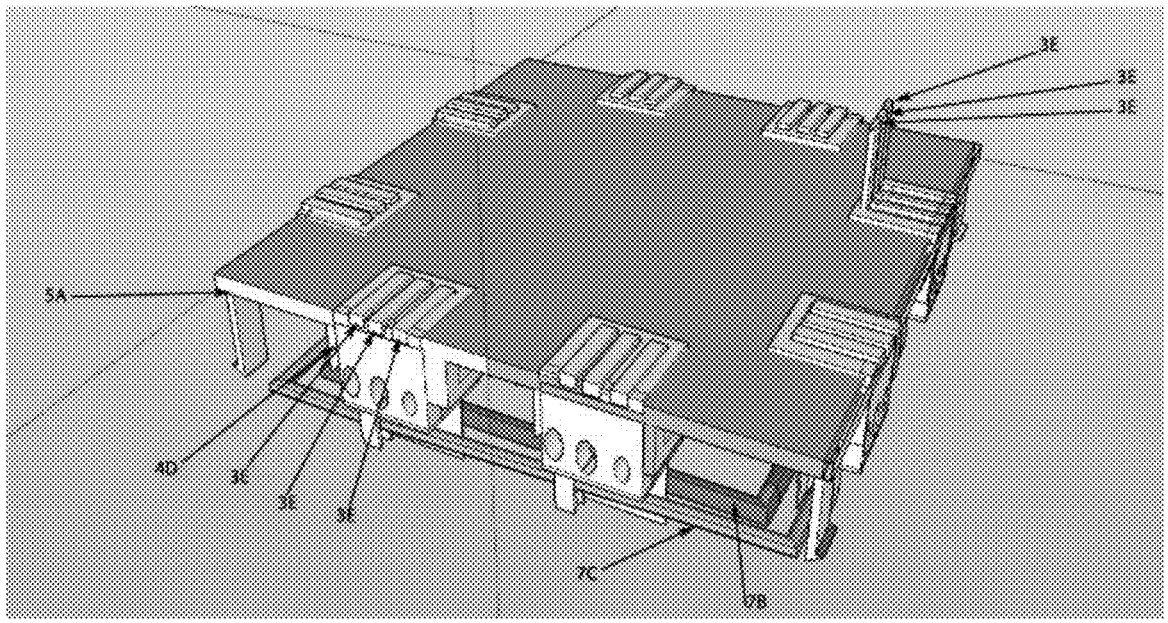
FIG. 5F is a top perspective view of an 8-port inner junction box with port sub-housings and lever-type wire connectors in accordance with the present disclosure.
FIG. 5G is a bottom perspective view of the same.

As described by FIG. 5F, eight assembled Wire Housing Unit with Lever-Top-FIG. 4D, are inserted into the Inner Junction Box Wire Clip Attachment Plate-FIG. 5A in the Clip Insertion Slots-5.

As described by FIG. 5G, labeled Lever-Top Inner Junction Box Assembled, eight assembled Wire Housing Unit with Lever-Top-FIG. 4D, are inserted into the Inner Junction Box Wire Clip Attachment Plate-FIG. 5A in the Clip Insertion Slots-5. The Black Wire Clips on the eight assembled Wire Housing Units are connected by Black Concentric Insulated Wire-7A, the Common Wire Clips are connected by the Common Concentric Insulated Wire-7B and the White Wire Clips are connected by the White Concentric Insulated Wire-7C.

Figure 6A:
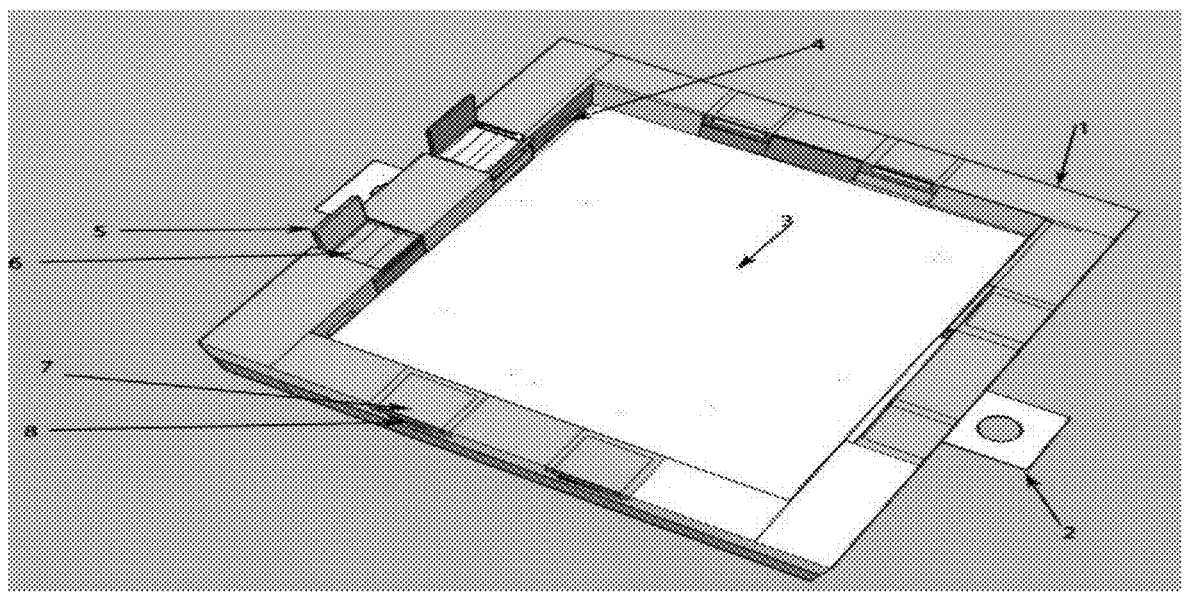
FIG. 6A is a top perspective view of the housing for an 8-port outer junction box in accordance with the present disclosure.

As depicted in FIG. 6A, the Outer Junction Box Wire Housing body-1 is a multi-part assembly comprised of two Wall Attachment plate-2, four inner box attachment slots-4, bottom cover-3, eight serrated wire cover plates-5 and eight serrated wire slots-6.

Serrated Wire cover plates closed-7 and serrated wire slots covered-8 are depicted for reference. Wall Attachment Plates-2 are used to secure the Outer Junction Box Wire Housing Body-1 to walls or ceiling by nails or screws via a circular opening in the center of the plate. The Wall Attachment Plates-2 are attached on the bottom of outer two opposite walls of the Outer Junction Box Wire Housing Body-1. Inner Box Attachment Slots-4 are two slots per wall, on two opposite walls, to secure the Inner Junction Box Wire Clip Attachment Plate, Plate Body-4 to the Outer Junction Box Wire Housing body-1 using the four outer body attachment clip-1 of the Inner Junction Box Wire Clip Attachment Plate. The Inner Body Attachment Slots-4 are located below the top edge of the Outer Junction Box Wire Housing body-1 wall. Bottom Cover-3 is glued to the bottom of the Outer Junction Box Wire Housing body-1. Serrated Wire Cover Plates-5 are serrated plastic cover plates which have protrusions attached from the ends of both sides of the serrated wire cover plate body which allows the Serrated Wire Cover plate to fit into a double L-shaped slot on each wall, which are cut on each side of the wire slot body. The serrated wire cover plates slide to open and close and lock into the rear upward pointing L-shape when closed. The serrations point inward toward the body of the housing to facilitate securing incoming wire. Serrated Wire Slots-6 extend completely through the body of the Outer Junction Box Wire Housing body-1, are cut out from the surface of Outer Junction Box Wire Housing body-1. The surfaces of the Serrated Wire Slots-6 are serrated with serrations facing toward the inner junction box wire clip attachment, plate body-4. Each of the side walls of the serrated wire slots-6 host the square double L-shaped slots, the L-shape beginning at the front of the wall and at rear, to allow the Serrated Wire Cover Plates-5 to attach to the Outer Junction Box Wire Housing body-1 to accommodate the Serrated Wire Cover Plates-5. Serrated Wire Cover Plates Closed-7 show Serrated Wire Cover Plates-6 in a closed position. Serrated Wire Slots Covered-8 show Serrated Wire Cover Plates-6 in a closed position and a wire slot opening.

Figure 6B:
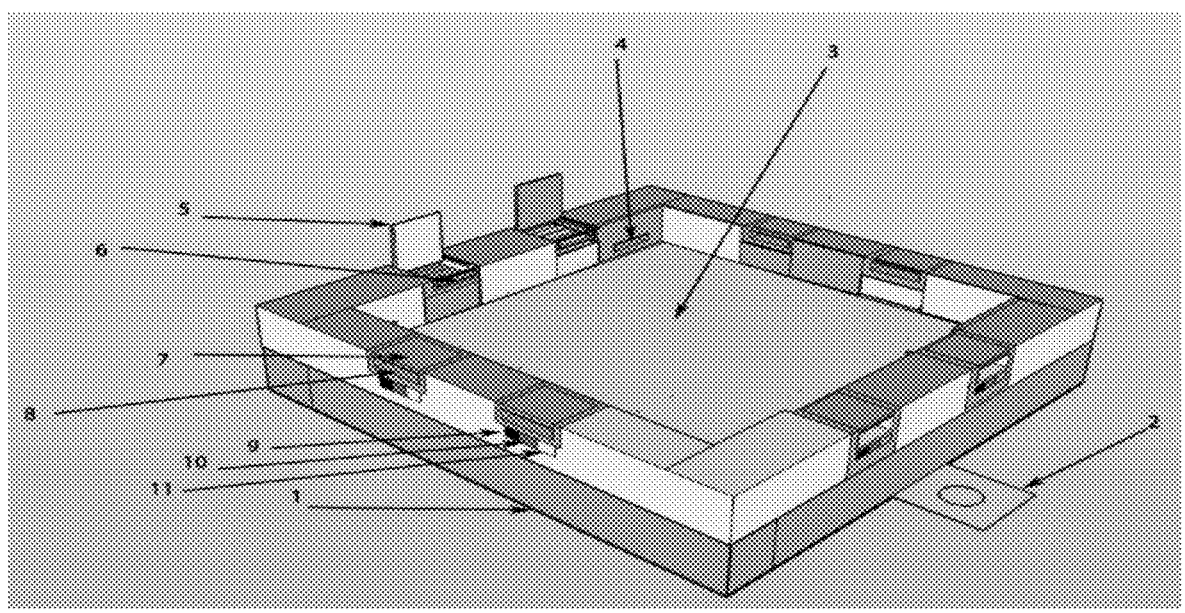
FIG. 6B is a top perspective view of an 8-port outer junction box in accordance with the present disclosure.

As depicted in FIG. 6B, the Outer Junction Box Wire Housing body-1 is shown from a top view. It is a multi-part assembly comprised of two Wall Attachment plate-2, four inner box attachment slots-4, bottom cover-3, eight serrated wire cover plates-5 and eight serrated wire slots-6. Serrated Wire cover plates closed-7 and serrated wire slots covered-8 are depicted for reference. Color coding for wire insertion is identified as Black Color Code-9, Common Color Code-10 and White Color Code-11.

Figure 6C:
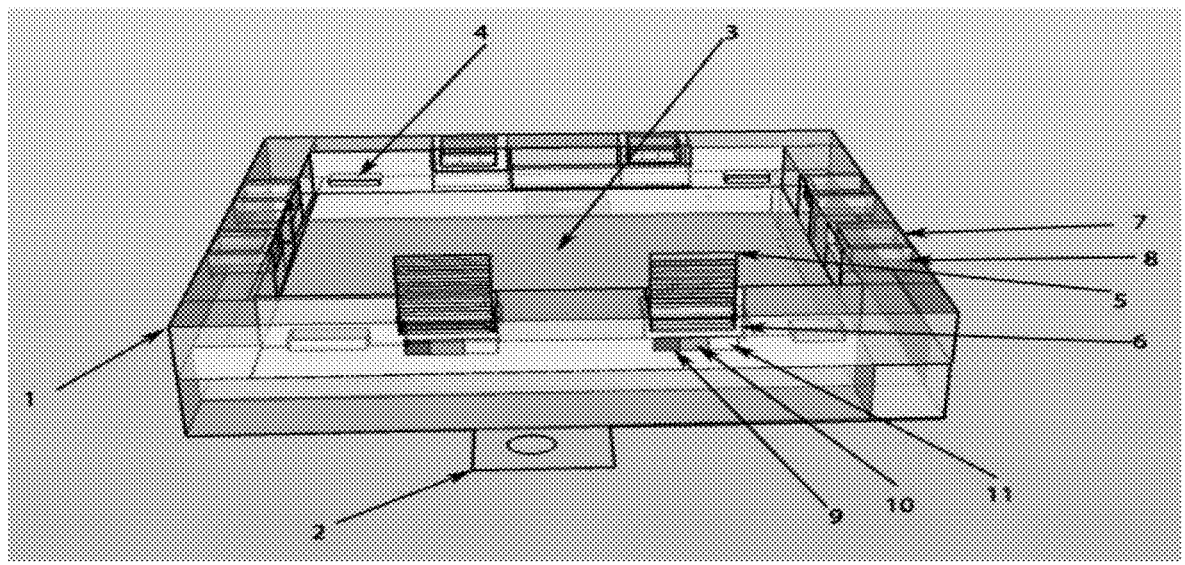
FIG. 6C is a top perspective, x-ray view of the housing for an 8-port outer junction box in accordance with the present disclosure.

As depicted in FIG. 6C, the Outer Junction Box Wire Housing body-1 is shown from an x-ray front view. It is a multi-part assembly comprised of two Wall Attachment plate-2, four inner box attachment slots-4, bottom cover-3, eight serrated wire cover plates-5 and eight serrated wire slots-6. Serrated Wire cover plates closed-7 and serrated wire slots covered-8 are depicted for reference. Color coding for wire insertion is identified as Black Color Code-9, Common Color Code-10 and White Color Code-11.

Figure 7A:
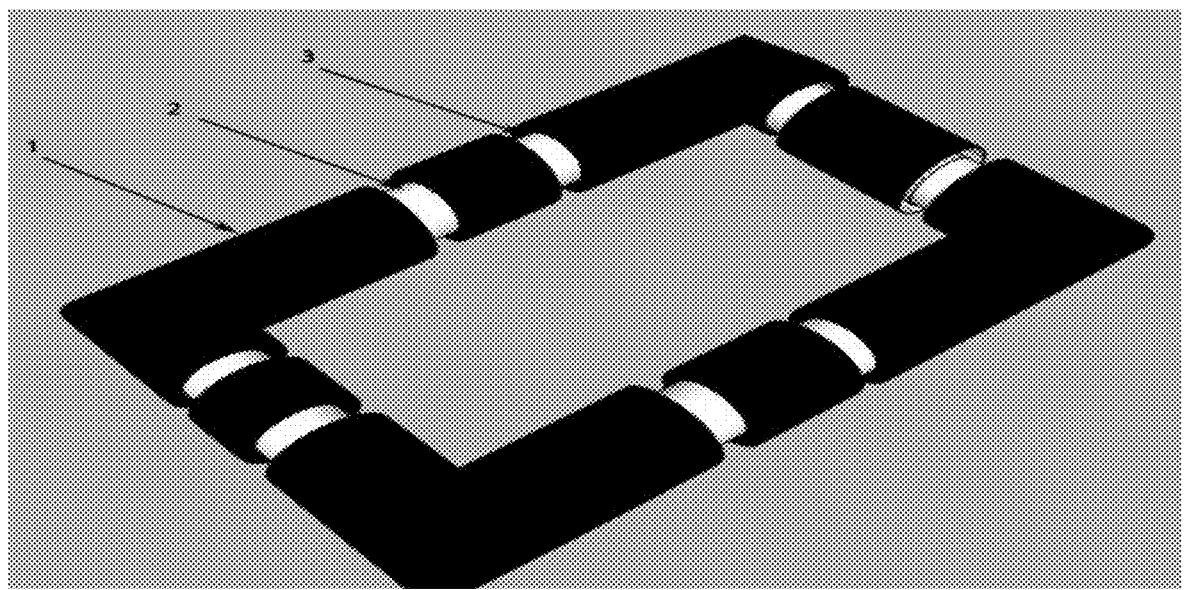
FIG. 7A is a top perspective view of a loop of insulated hot (black) wire for an 8-port junction box in accordance with the present disclosure.

FIG. 7A shows Black Insulation-1 covering bare copper wire which is exposed at Wire Attachment Slot-1 and Wire Attachment Slot-2. The wire attachment slots are duplicated on all four sides of the concentrically shaped wire and are used to facilitate contact between multiple black wire clips on the multiple Wire Traps.

Figure 7B:
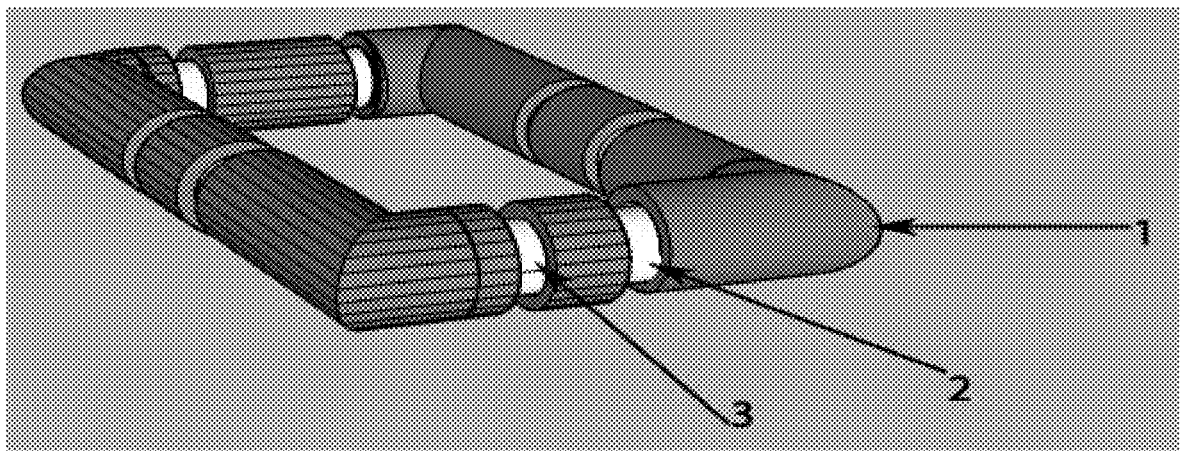
FIG. 7B is a top perspective view of a loop of insulated ground wire for an 8-port junction box in accordance with the present disclosure.

FIG. 7B shows Gray Insulation-1 covering bare copper wire which is exposed at Wire Attachment Slot-1 and Wire Attachment Slot-2. The wire attachment slots are duplicated on all four sides of the concentrically shaped wire and are used to facilitate contact between multiple common wire clips on the multiple Wire Traps.

Figure 7C:
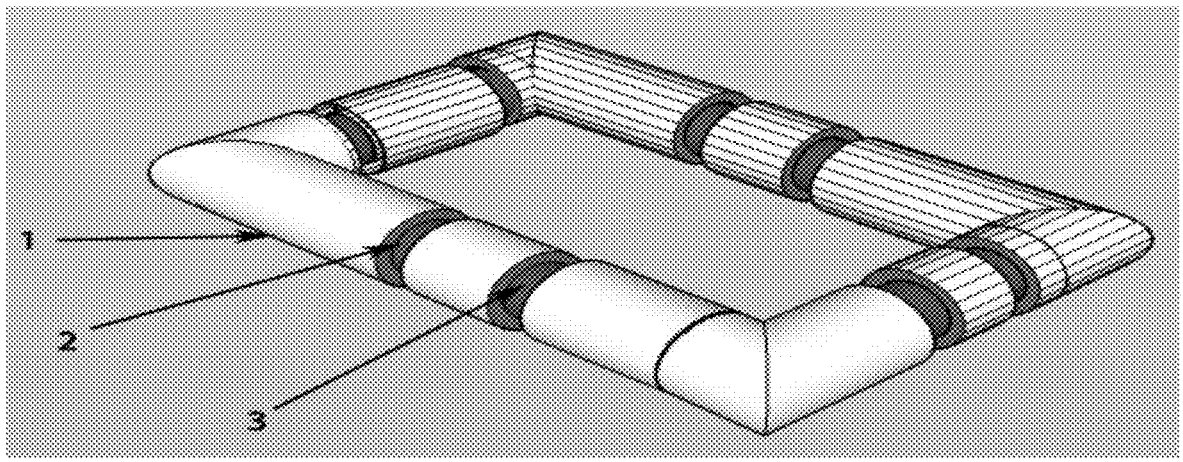
FIG. 7C is a top perspective view of a loop of insulated neutral (white) wire for an 8-port junction box in accordance with the present disclosure.

FIG. 7C shows White Insulation-1 covering bare copper wire which is exposed at Wire Attachment Slot-1 and Wire Attachment Slot-2. The wire attachment slots are duplicated on all four sides of the concentrically shaped wire and are used to facilitate contact between multiple white wire clips on the multiple Wire Traps.

Figure 8A:
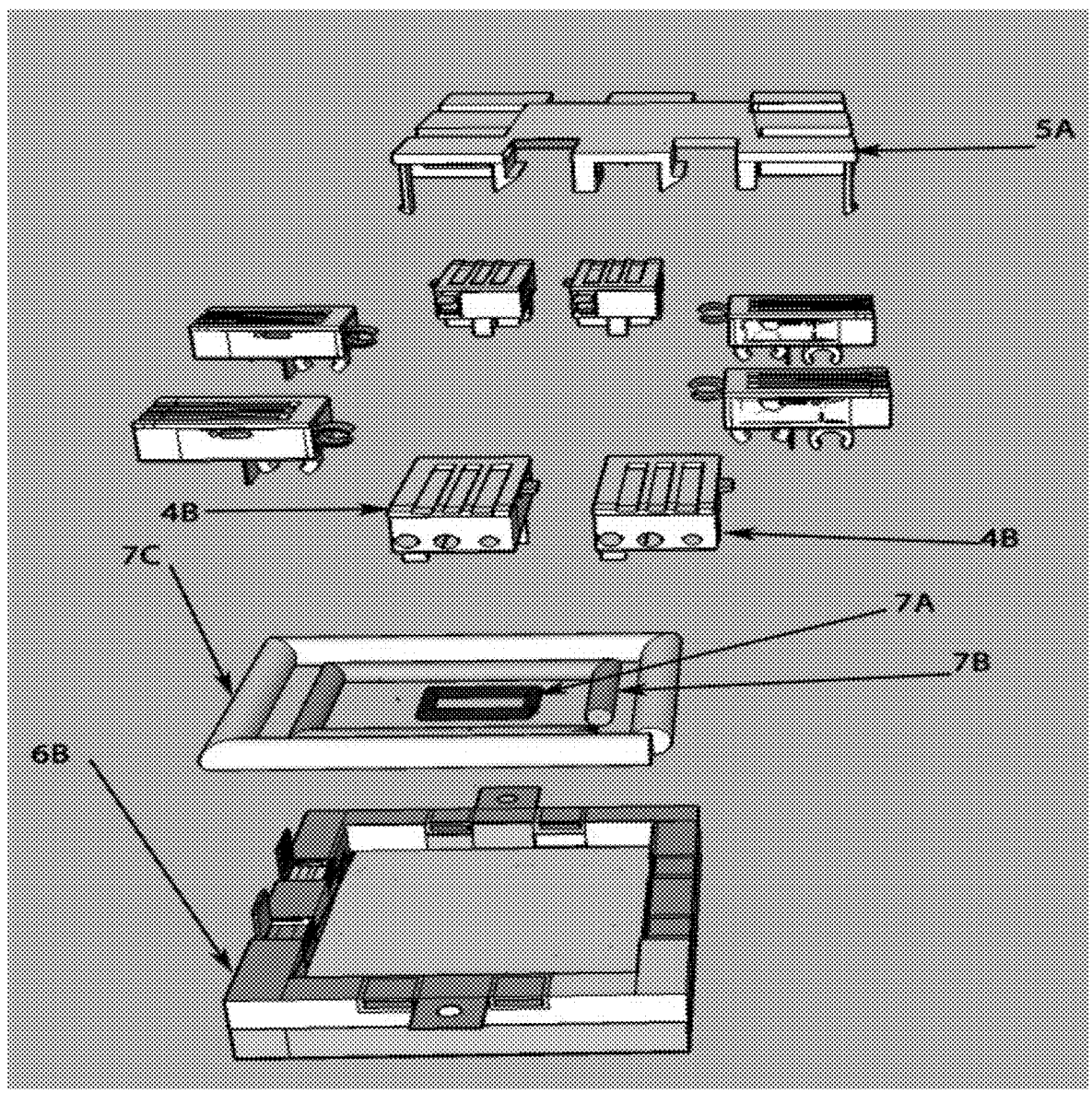
FIG. 8A is top perspective view of the unassembled components of an 8-port junction box with flat-type wire connectors in accordance with the present disclosure.

FIG. 8A is the exploded view of the Flat-Top Junction Box assembly. It is comprised of Outer Junction Box Wire Housing-6B, Black Concentric Insulated Wiring-7A, Common Concentric Insulated Wiring-7B, White Concentric Insulated Wiring-7C, eight Assembled Wire Clip Assembly-FIG. 4B and the Inner Junction Box Wire Clip Attachment Plate-FIG. 5A.

Figure 8B:
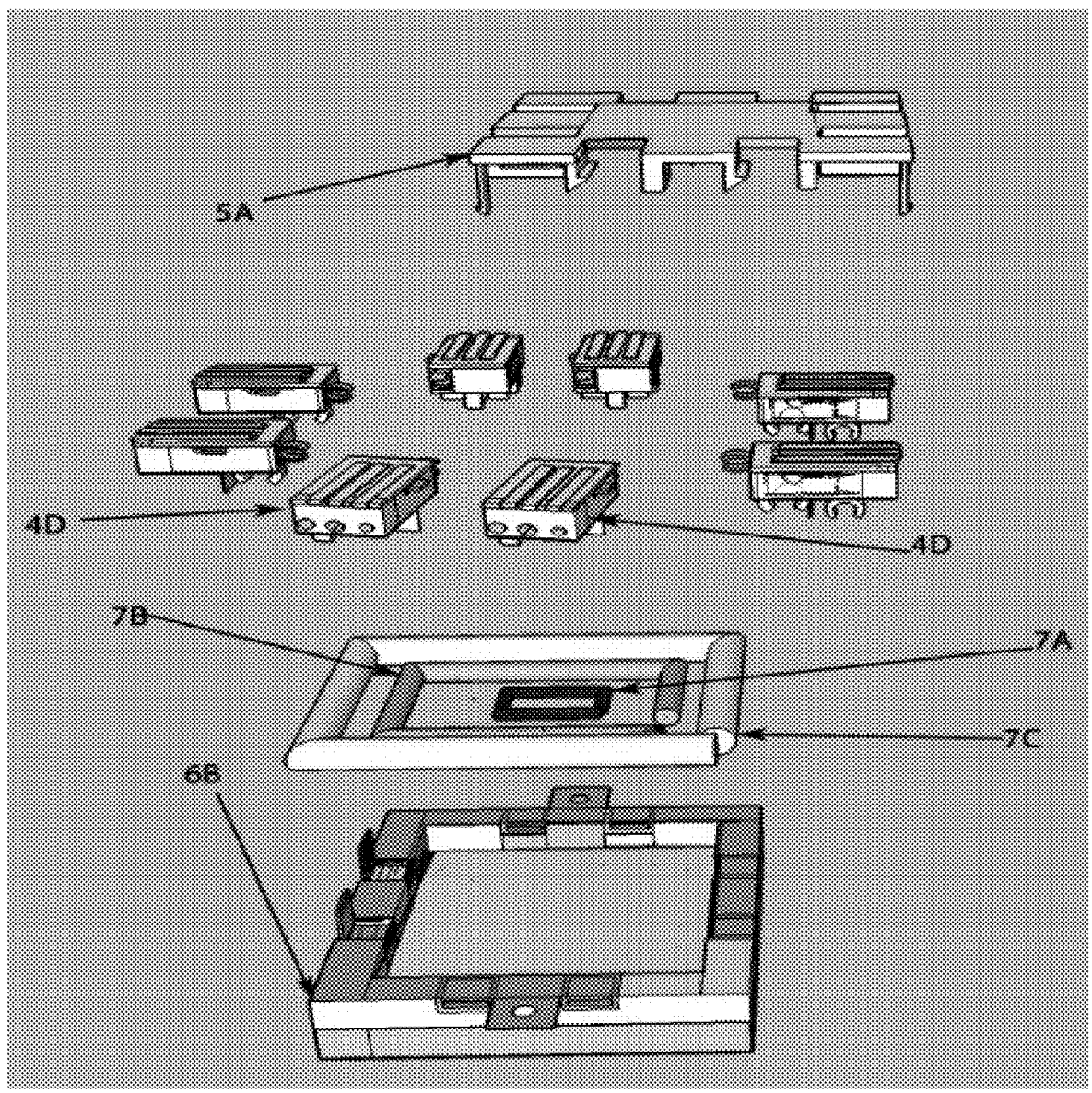
FIG. 8B is top perspective view of the unassembled components of an 8-port junction box with lever-type wire connectors in accordance with the present disclosure.

FIG. 8B is the exploded view of the Lever-Top Junction Box assembly. It is comprised of Outer Junction Box Wire Housing-6B, Black Concentric Insulated Wiring-7A, Common Concentric Insulated Wiring-7B, White Concentric Insulated Wiring-7C, eight Assembled Wire Clip Assembly-FIG. 4D and the Inner Junction Box Wire Clip Attachment Plate-FIG. 5A.

Figure 8C:
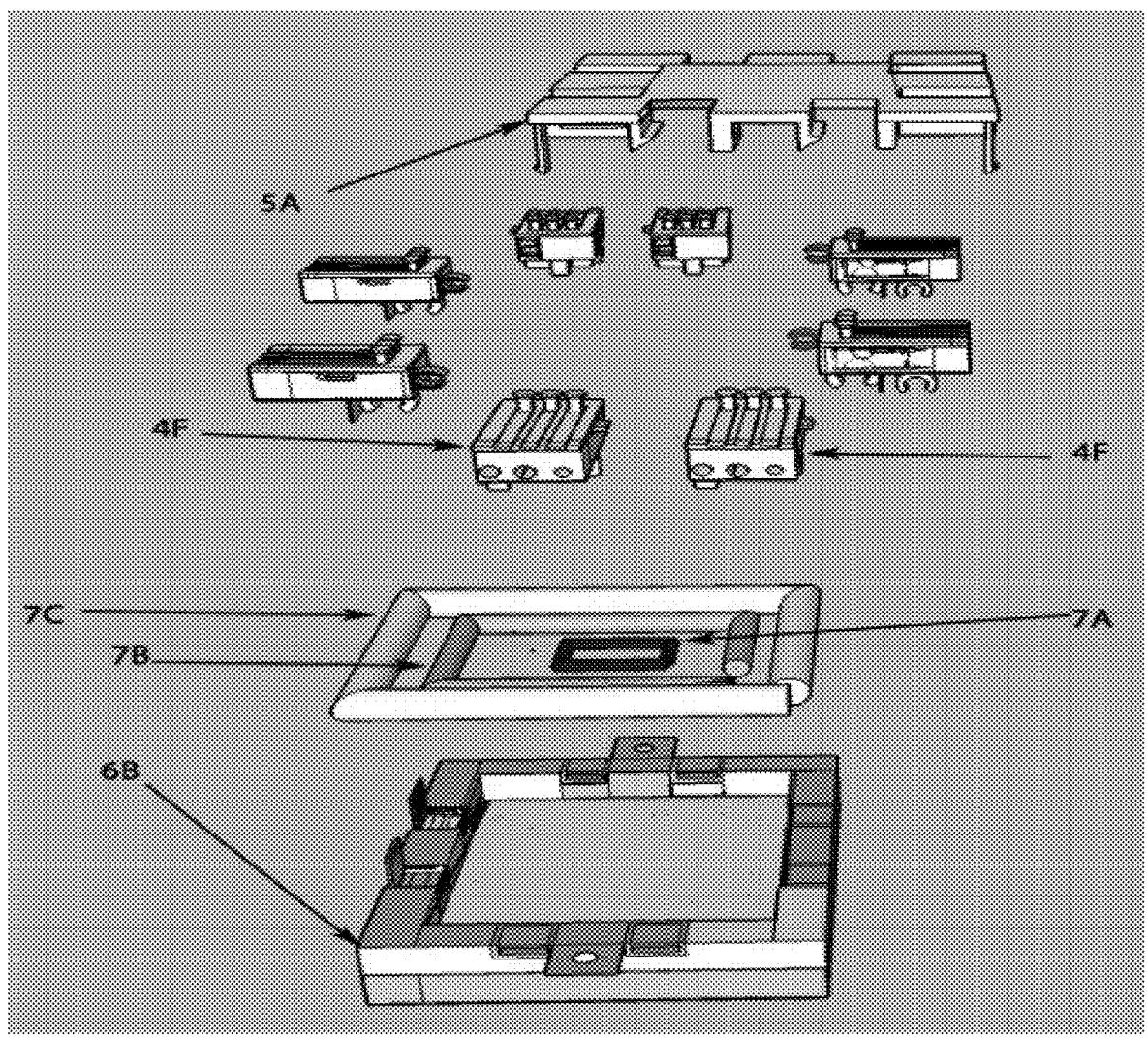
FIG. 8C is top perspective view of the unassembled components of an 8-port junction box with push-type wire connectors in accordance with the present disclosure.

FIG. 8C is the exploded view of the Lever-Top Junction Box assembly. It is comprised of Outer Junction Box Wire Housing-6B, Black Concentric Insulated Wiring-7A, Common Concentric Insulated Wiring-7B, White Concentric Insulated Wiring-7C, eight Assembled Wire Clip Assembly-FIG. 4F and the Inner Junction Box Wire Clip Attachment Plate-FIG. 5A.

Figure 9A:
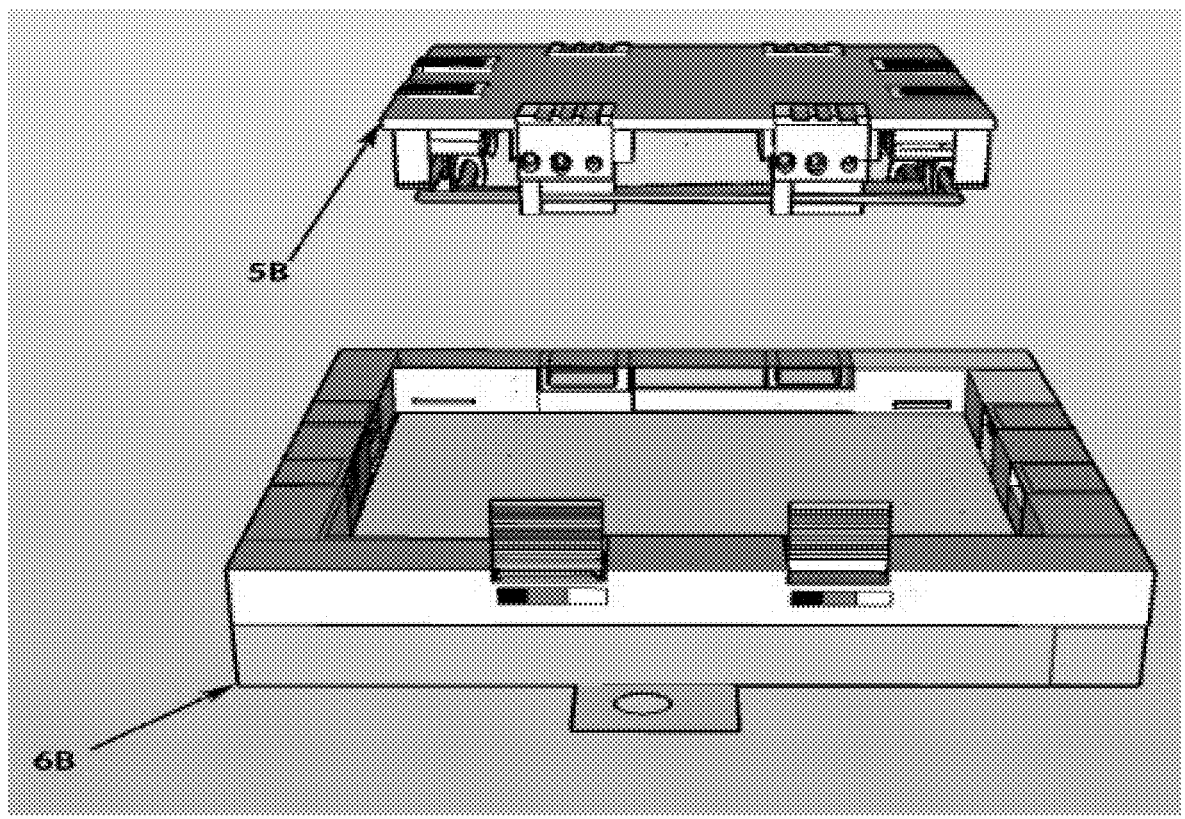
FIG. 9A is a top perspective view of an 8-port inner junction box and 8-port outer junction box with flat-type wire connectors in accordance with the present disclosure, the boxes shown separated.
Figure 9B:
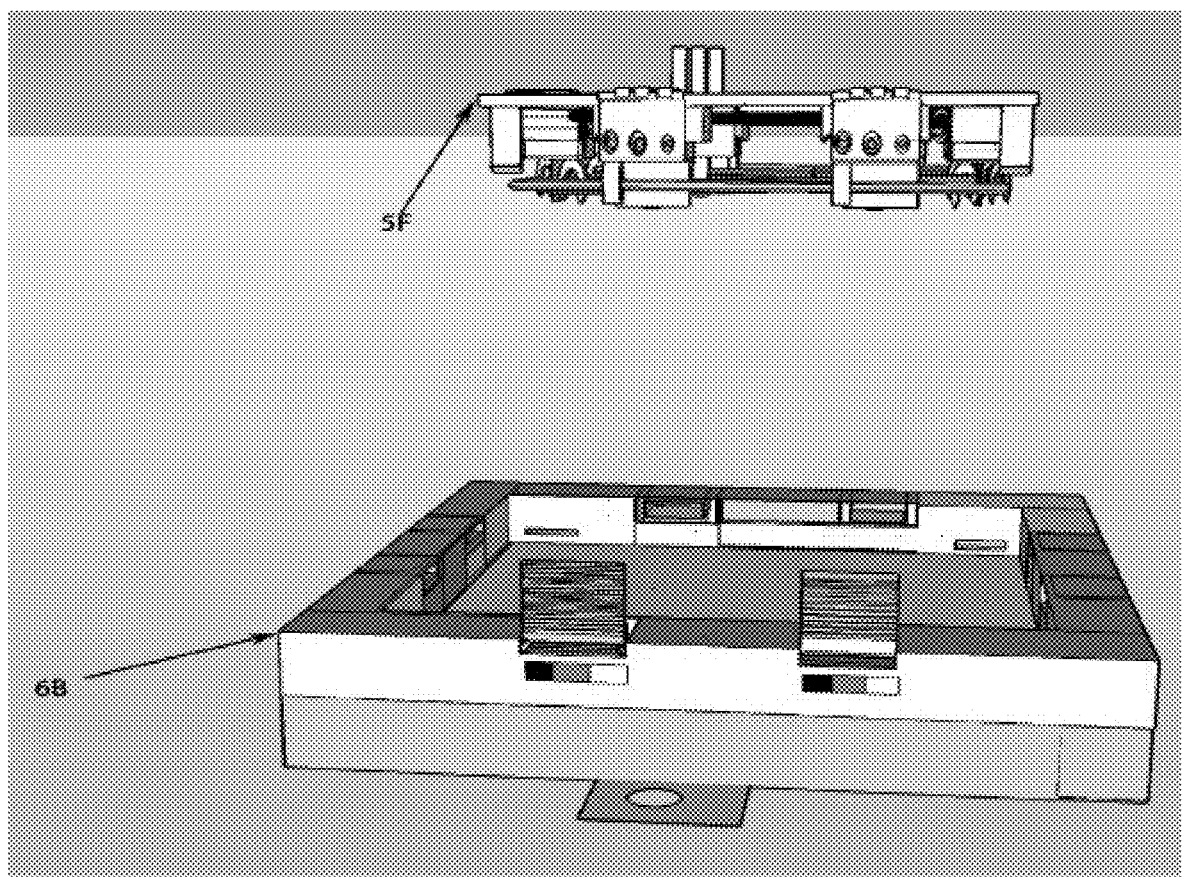
FIG. 9B is a top perspective view of an 8-port inner junction box and 8-port outer junction box with lever-type wire connectors in accordance with the present disclosure, the boxes shown separated.

FIG. 9A is the exploded view of the Flat-Top Junction Box assembly. It is comprised of Outer Junction Box Wire Housing-6B and the Inner Junction Box Wire Clip Attachment Plate-FIG. 5B FIG. 9B is the exploded view of the Lever-Top Junction Box assembly. It is comprised of Outer Junction Box Wire Housing-6B and the Inner Junction Box Wire Clip Attachment Plate-FIG. 5F.

Figure 9C:
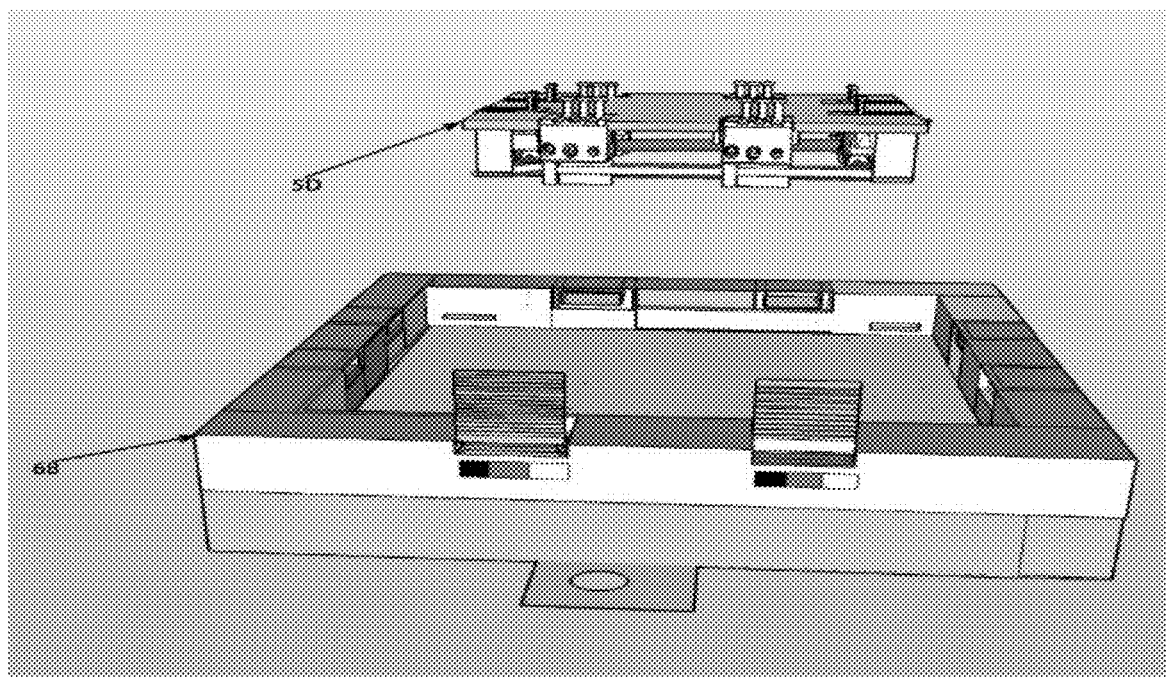
FIG. 9C is a top perspective view of an 8-port inner junction box and 8-port outer junction box with push-type wire connectors in accordance with the present disclosure, the boxes shown separated.
Figure 10A:
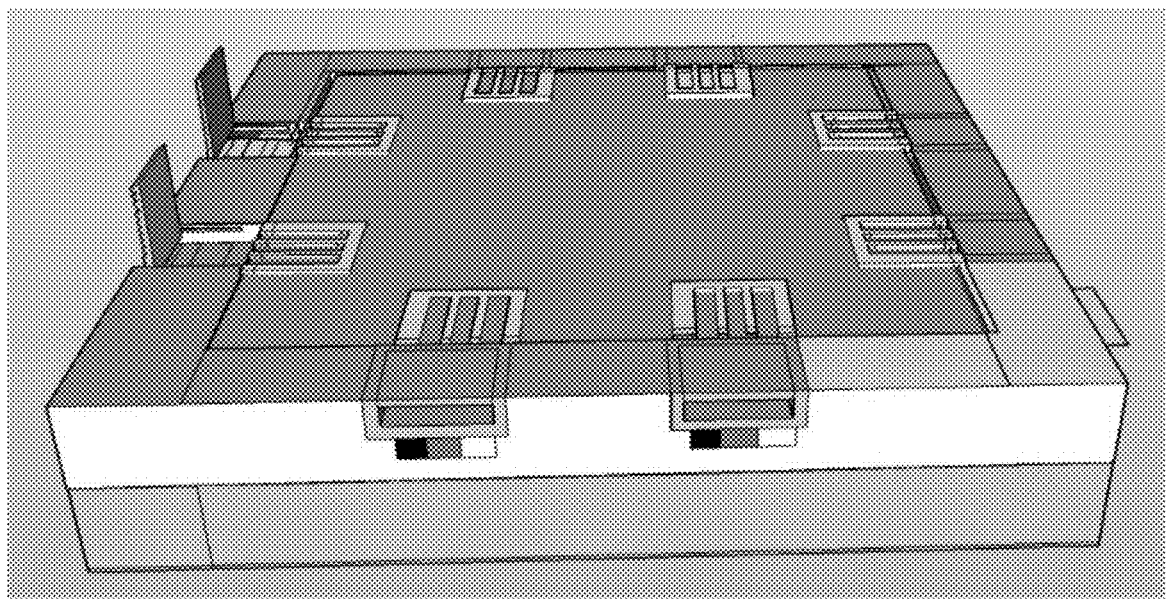
FIG. 10A is a top perspective view of a fully assembled 8-port junction box with flat-type wire connectors in accordance with the present disclosure.

FIG. 9C is the exploded view of the Push-Top Junction Box assembly. It is comprised of Outer Junction Box Wire Housing-6B and the Inner Junction Box Wire Clip Attachment Plate-FIG. 5D As described by FIG. 10A, the Push-in eight port Electrical Connector Flat-Top Junction Box 1 is a complete assembly of all previously described parts.

Figure 10B:
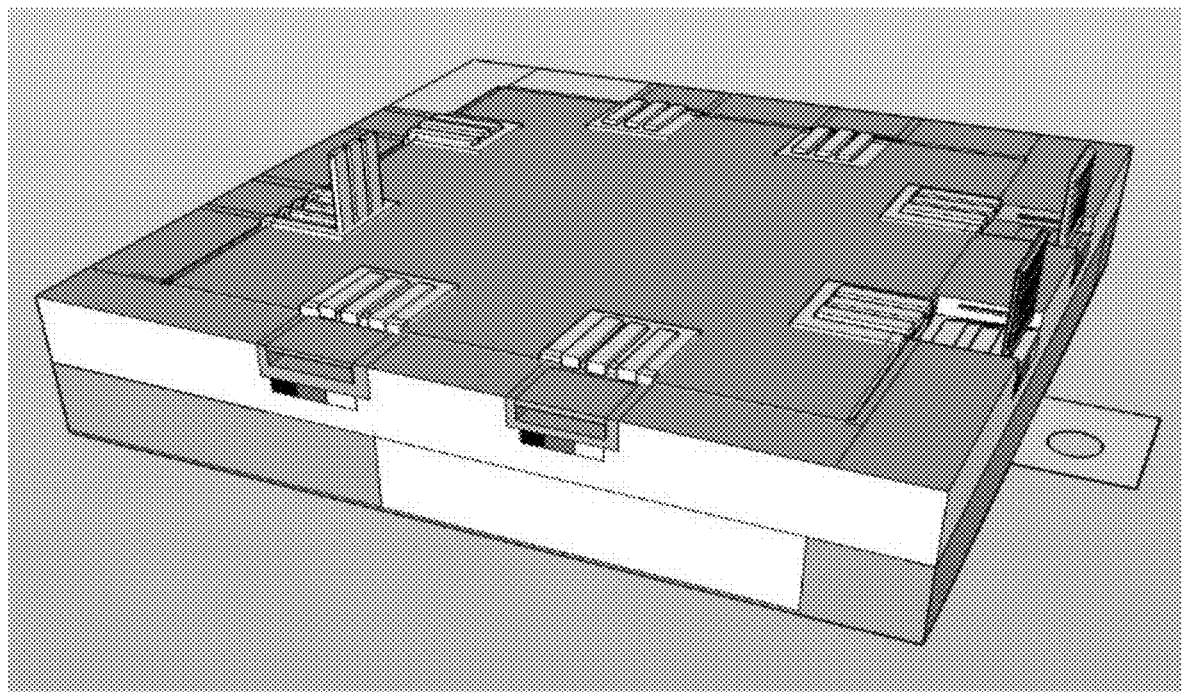
FIG. 10B is a top perspective view of a fully assembled 8-port junction box with lever-type wire connectors in accordance with the present disclosure.

As described by FIG. 10B, the Push-in eight port Electrical Connector Lever-Top Junction Box 2 is a complete assembly of all previously described parts.

Figure 10C:
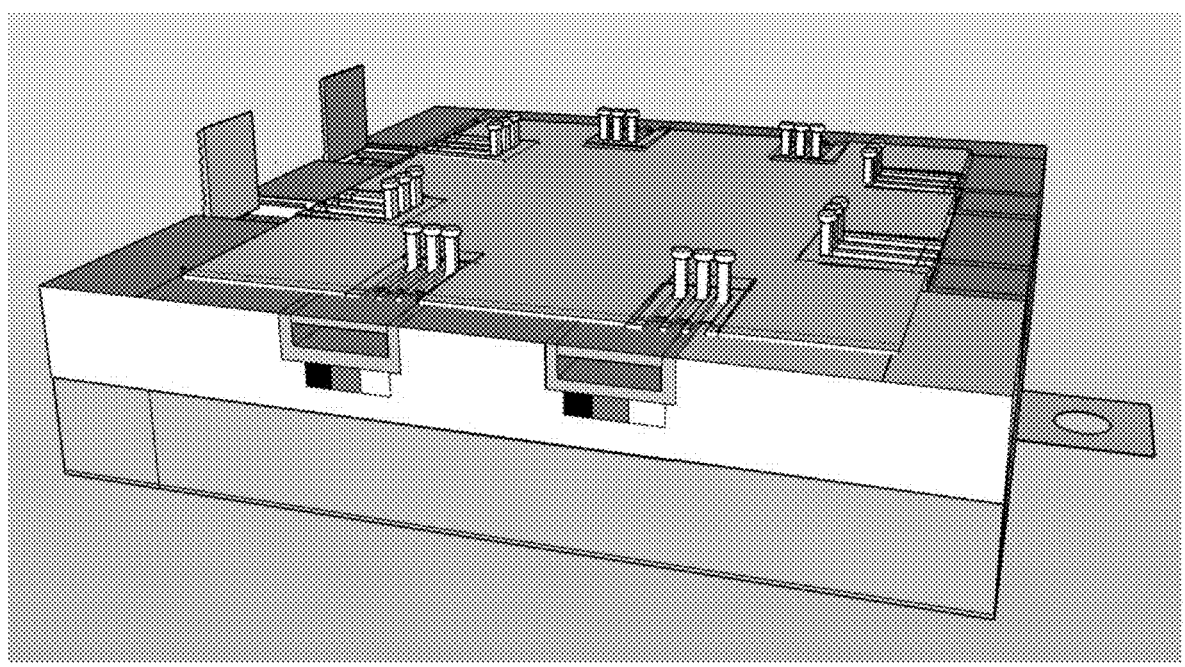
FIG. 10C is a top perspective view of a fully assembled 8-port junction box with lever-type wire connectors in accordance with the present disclosure.

As described by FIG. 10C, the Push-in eight port Electrical Connector Push-Top Junction Box 3 is a complete assembly of all previously described parts.

Figure 11A:
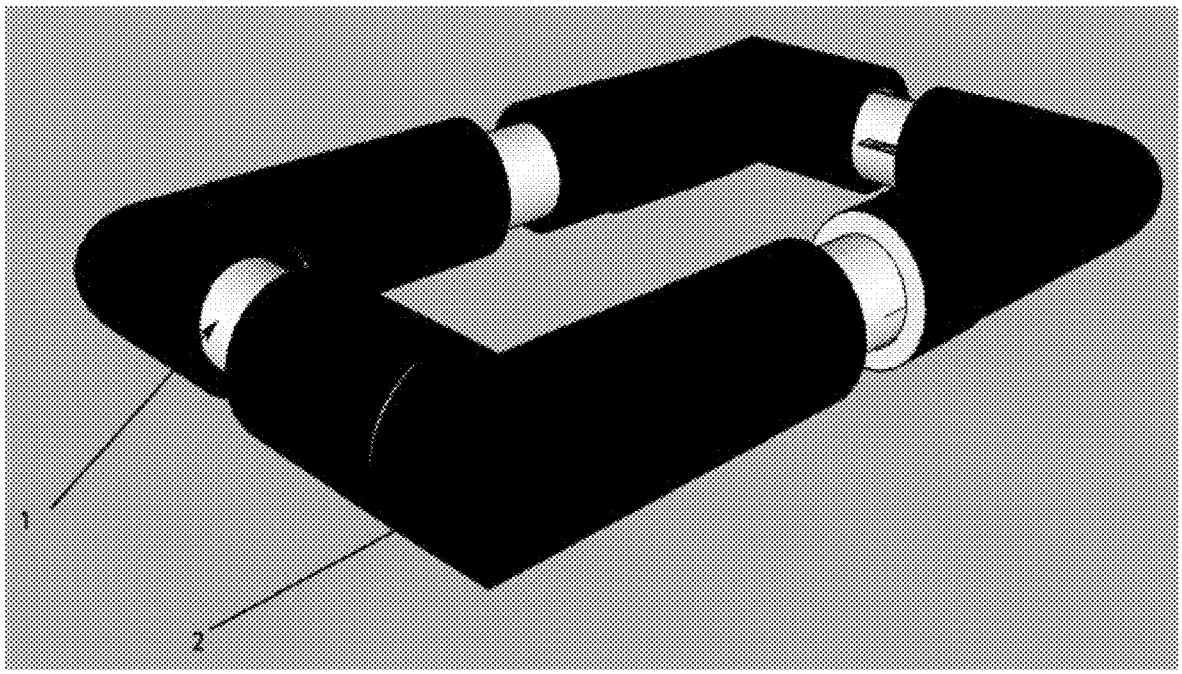
FIG. 11A is a top perspective view of a loop of insulated hot (black) wire for a 4-port junction box in accordance with the present disclosure.

FIG. 11A shows Black Insulation-1 covering bare copper wire which is exposed at Wire Attachment Slot-1 and Wire Attachment Slot-2. The wire attachment slots are duplicated on all four sides of the concentrically shaped wire and are used to facilitate contact between multiple black wire clips on the multiple Wire Traps.

Figure 11B:
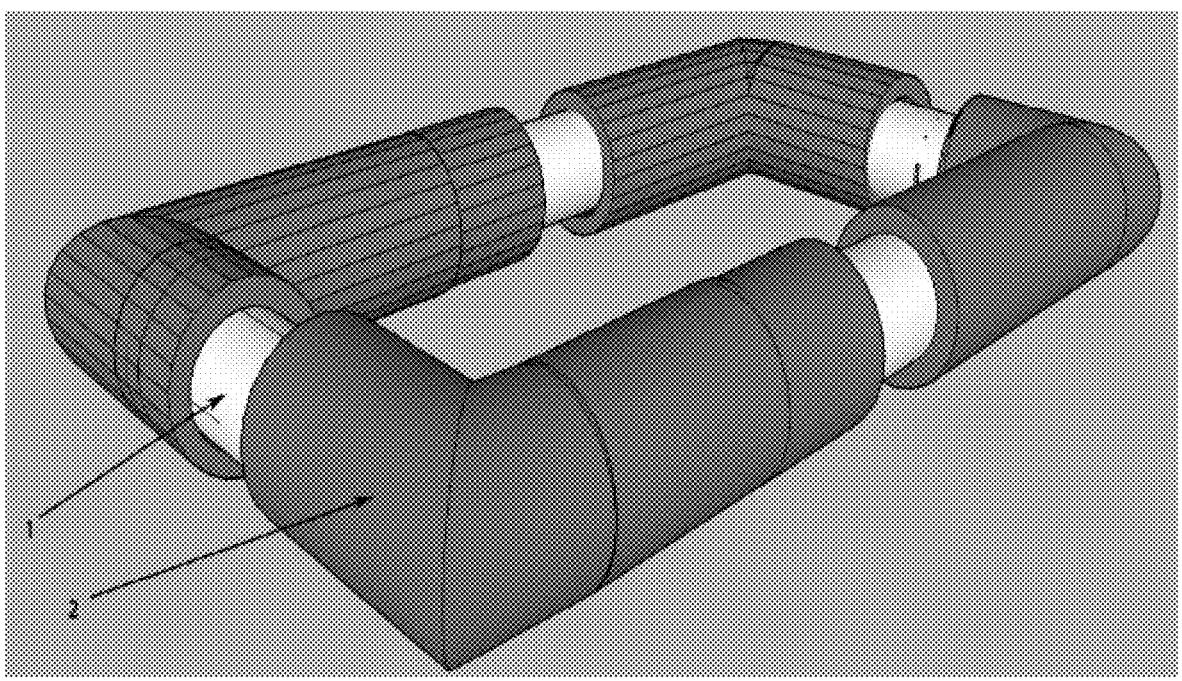
FIG. 11B a top perspective view of a loop of insulated ground wire for a 4-port junction box in accordance with the present disclosure.

FIG. 11B shows Gray Insulation-1 covering bare copper wire which is exposed at Wire Attachment Slot-1 and Wire Attachment Slot-2. The wire attachment slots are duplicated on all four sides of the concentrically shaped wire and are used to facilitate contact between multiple common wire clips on the multiple Wire Traps.

Figure 11C:
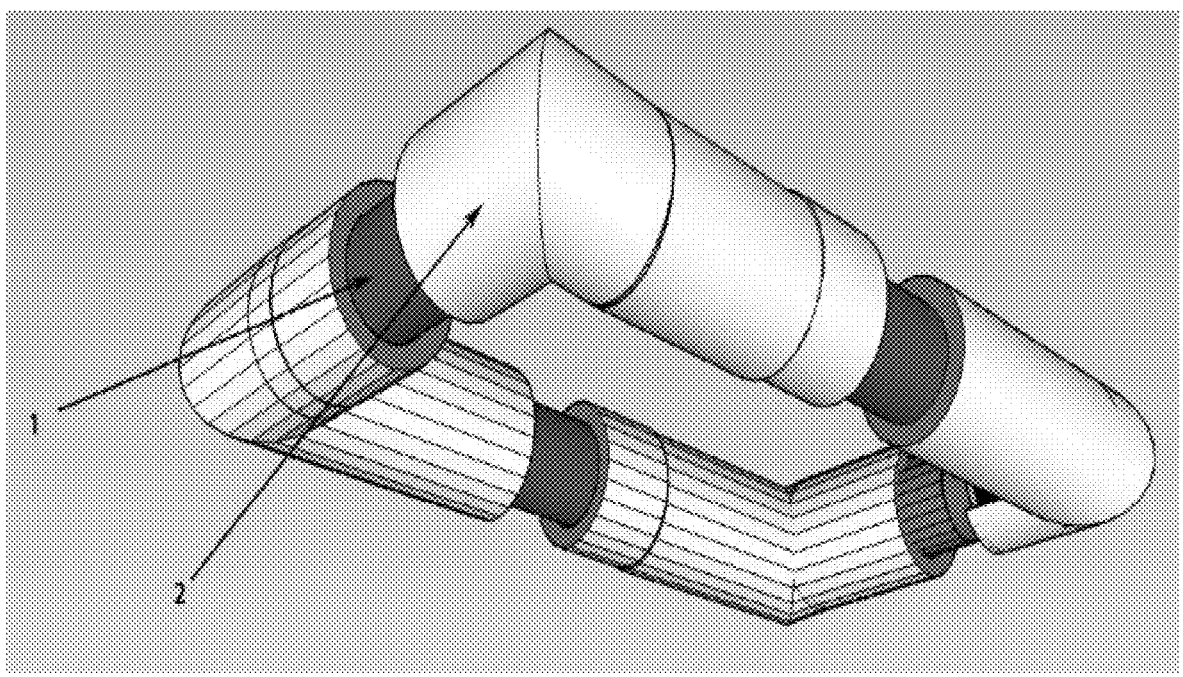
FIG. 11C a bottom perspective view of a loop of insulated neutral (white) wire for a 4-port junction box in accordance with the present disclosure.

FIG. 11C shows White Insulation-1 covering bare copper wire which is exposed at Wire Attachment Slot-1 and Wire Attachment Slot-2. The wire attachment slots are duplicated on all four sides of the concentrically shaped wire and are used to facilitate contact between multiple white wire clips on the multiple Wire Traps.

Figure 12A:
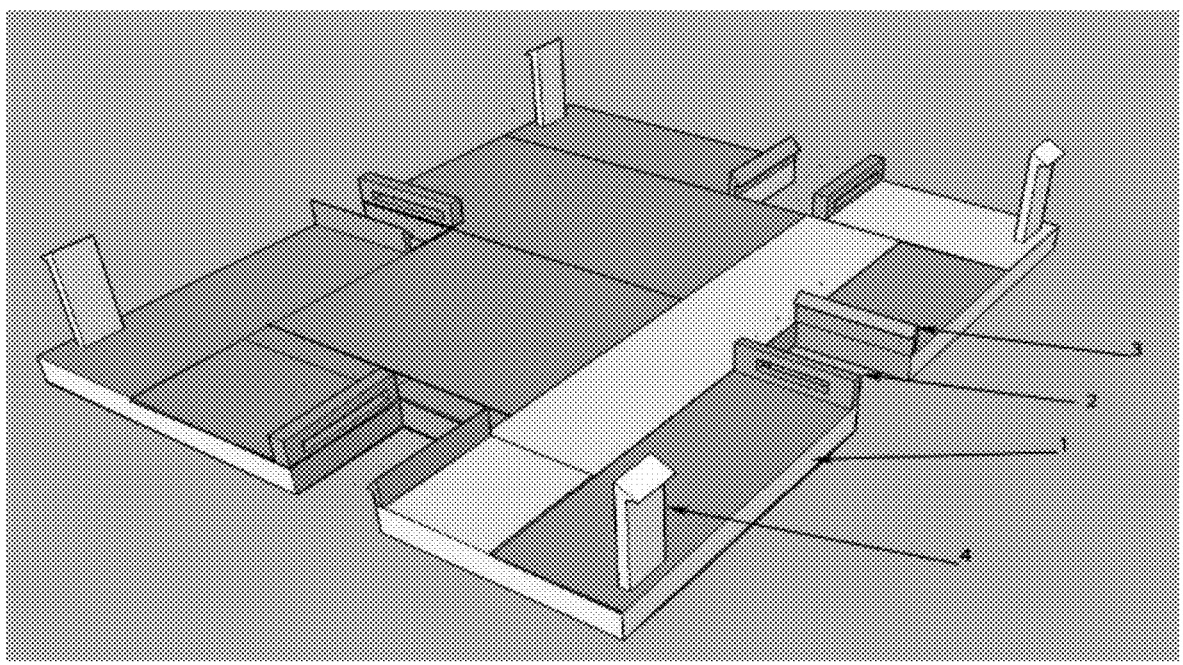
FIG. 12A is a top perspective view of a connector attachment plate for a 4-port junction box in accordance with the present disclosure.

As depicted in FIG. 12A, Inner Junction Box Wire Clip Attachment Plate is a four-part assembly comprised of the Plate Body-1, outer body attachment clip-1, wire housing attachment slot-3 and wire housing attachment protrusion-2.

Wire Housing Attachment Slot-3 and Wire Housing Attachment Protrusion-2 are separated by an open space Clip Insertion Slot-5. Clip Insertion Slot-5 allows the Wire Trap Assembly to be placed so that the roof of the Wire Trap Assembly is above the body of Plate Body-1 to allow access to Lever or Push Tops. Attached to and perpendicular to the plate body-1, are four outer body attachment clips-4. Attached to the front of outer body attachment clip-4, is the acutely angled clip, which allow the plate body-1 to be attached to Outer Junction Box Wire Housing-12B. Attached to, at the front edge and perpendicular to the bottom of Plate Body-1, are wire housing attachment protrusion-3 and wire housing attachment slot-2. The acutely angled wire housing attachment protrusion-3 allows attachment to the assembled wire clip assembly. The body of the wire housing attachment slot-2 will accommodate the assembled wire clip assembly housing attachment protrusion-12. The spacing between the wire housing attachment slot-2 and the wire housing attachment protrusion-3, described as Clip Insertion Slot-5, is the width and length of the wire housing body. The wire housing attachment slot-2 and the wire housing attachment protrusion-3 are paired as single units, referred to as housing clip arrangements. For the four port electrical junction box, there are four housing clip arrangements, one arrangement per each side of Plate Body-1. The total width of two housing clip arrangements will accommodate the assembled wire clip assembly. The two housing clip arrangements are centered on each side of plate body-1.

Figure 12B:
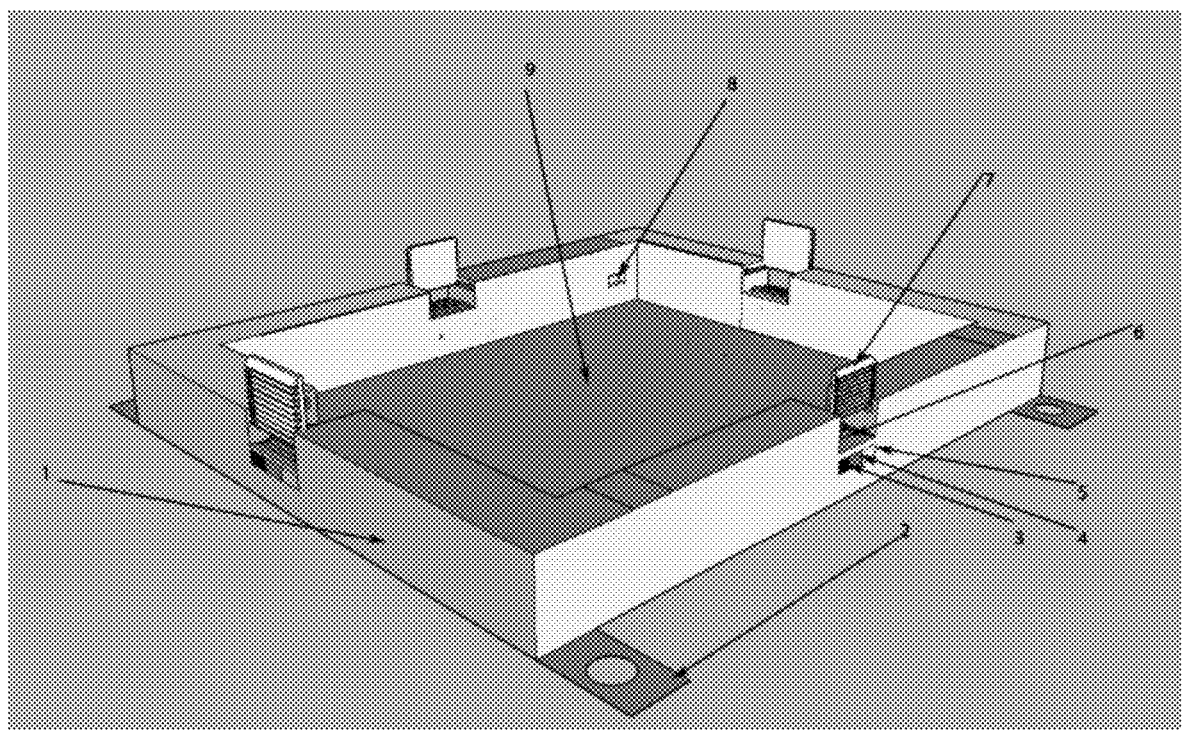
FIG. 12B is a top perspective view of a 4-port outer junction box in accordance with the present disclosure.

As depicted in FIG. 12B, the Outer Junction Box Wire Housing body-1 is a multi-part assembly comprised of four Wall Attachment plate-2, four inner box attachment slots-8, bottom cover-9, four serrated wire cover plates-7 and four serrated wire slots-6. It has identifying wire panel of Black-3, Burgandy-4 and White-5.

Wall Attachment Plates-2 are used to secure the Outer Junction Box Wire Housing Body-1 to walls or ceiling by nails or screws via a circular opening in the center of the plate. The Wall Attachment Plates-2 are attached on the four corners of the outer walls of the Outer Junction Box Wire Housing Body-1.

Inner Box Attachment Slots-4 are two slots per wall, on two opposite walls, to secure the Inner Junction Box Wire Clip Attachment Plate, Plate Body-1 to the Outer Junction Box Wire Housing body-1 using the four outer body attachment clip-4 of the Inner Junction Box Wire Clip Attachment Plate. The Inner Body Attachment Slots-8 are located below the top edge of the Outer Junction Box Wire Housing body-1 wall.

Bottom Cover-9 is glued to the bottom of the Outer Junction Box Wire Housing body-1.

Serrated Wire Cover Plates-7 are serrated plastic cover plates which have protrusions attached at the lower ends of both sides of the serrated wire cover plate body which allows the Serrated Wire Cover plate to fit into a double L-shaped slot on each wall, such slots are below the top edge of the top of the walls of the serrated wire slot on each side of the wire slot body. The serrated wire cover plates slide to open and close and lock into the rear upward pointing L-shape when closed. The serrations point inward toward the body of the housing to facilitate securing incoming wire.

Serrated Wire Slots-6 extend completely through the body of the Outer Junction Box Wire Housing body-1, are cut out from the surface of Outer Junction Box Wire Housing body-1. The surfaces of the Serrated Wire Slots-6 are serrated with serrations facing toward the inner junction box wire clip attachment, plate body-1. Each of the side walls of the serrated wire slots-6 host the square double L-shaped slots, the L-shape beginning at the front of the wall and at rear, to allow the Serrated Wire Cover Plates-7 to attach to the Outer Junction Box Wire Housing body-1 to accommodate the Serrated Wire Cover Plates-7.

Figure 12C:
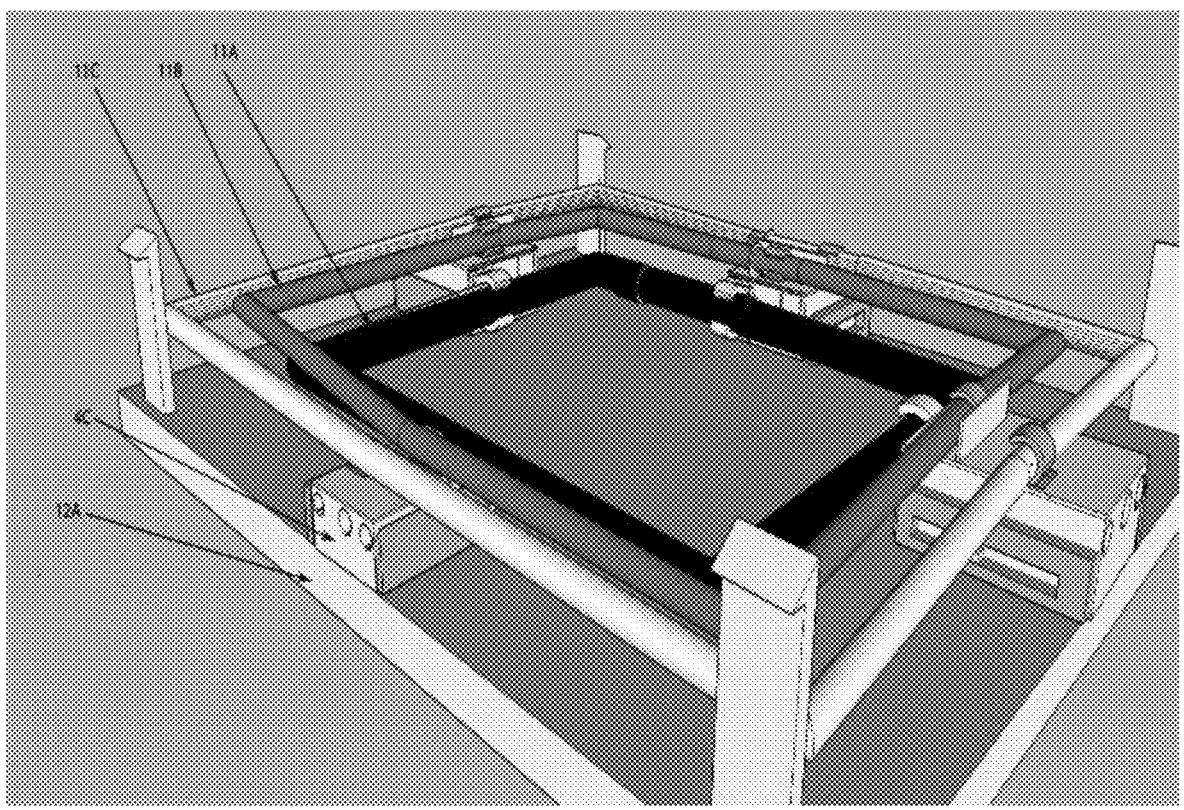
FIG. 12C is a bottom perspective view of a 4-port inner junction box with insulated wire in accordance with the present disclosure.

FIG. 12C, is the Perspective Assembled View of the Inner Junction Box-12C, Assembled Wire Clip Assembly-4C, Black Wire-11A, Common Wire-11B and White Wire-11C.

Figure 12D:
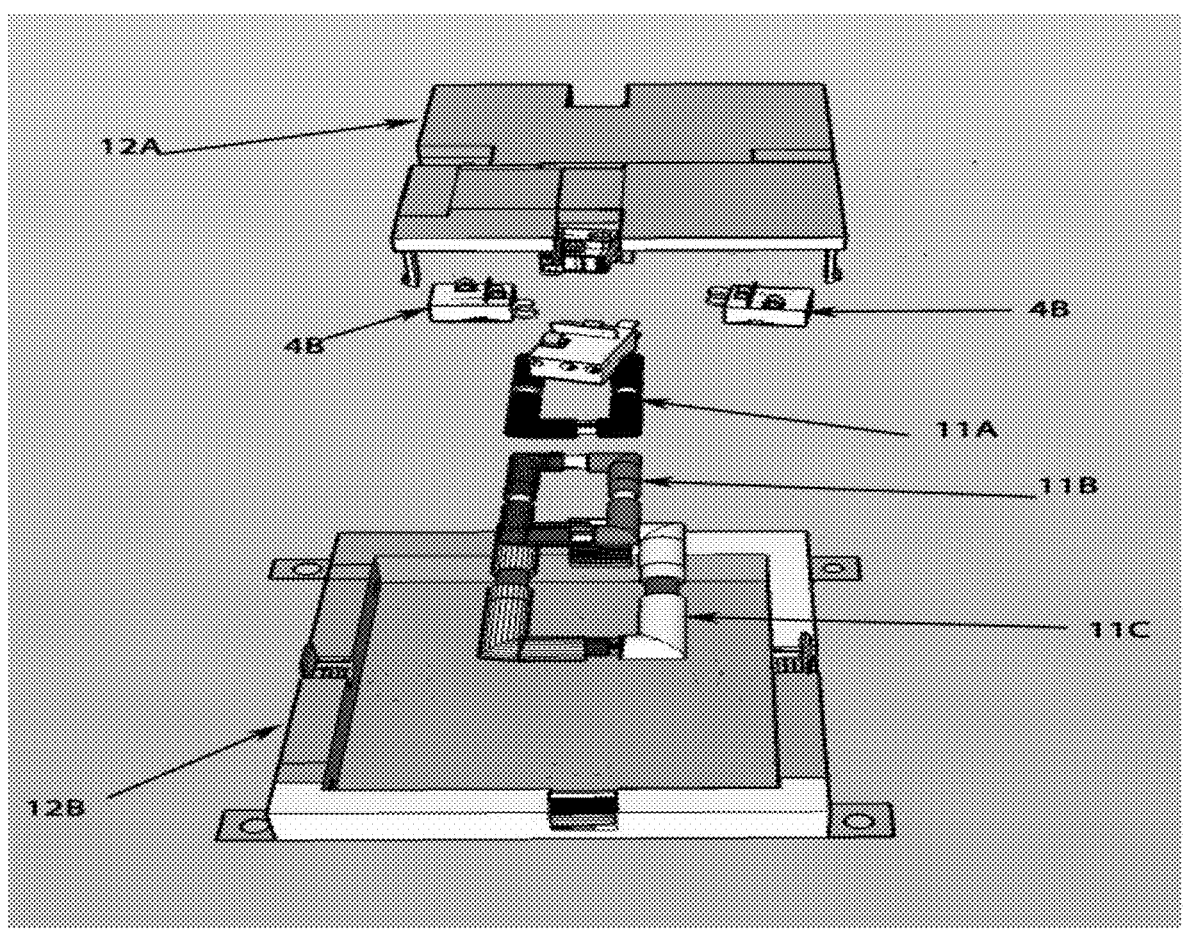
FIG. 12D is a top perspective view of a 4-port inner junction box and 4-port outer junction box in accordance with the present disclosure, the boxes shown separated and partially assembled.
Figure 12E:
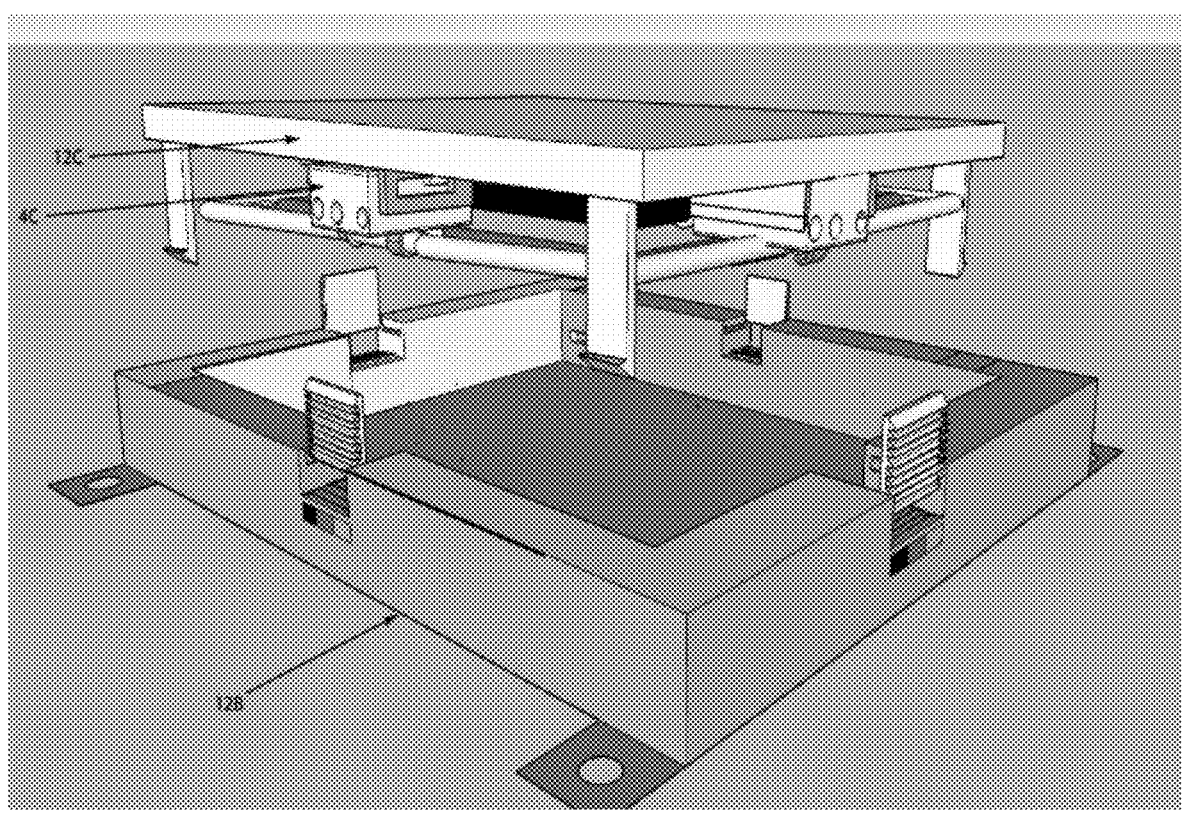
FIG. 12E is a top perspective view of a 4-port inner junction box and 4-port outer junction box in accordance with the present disclosure, the boxes shown separated.
Figure 12F:
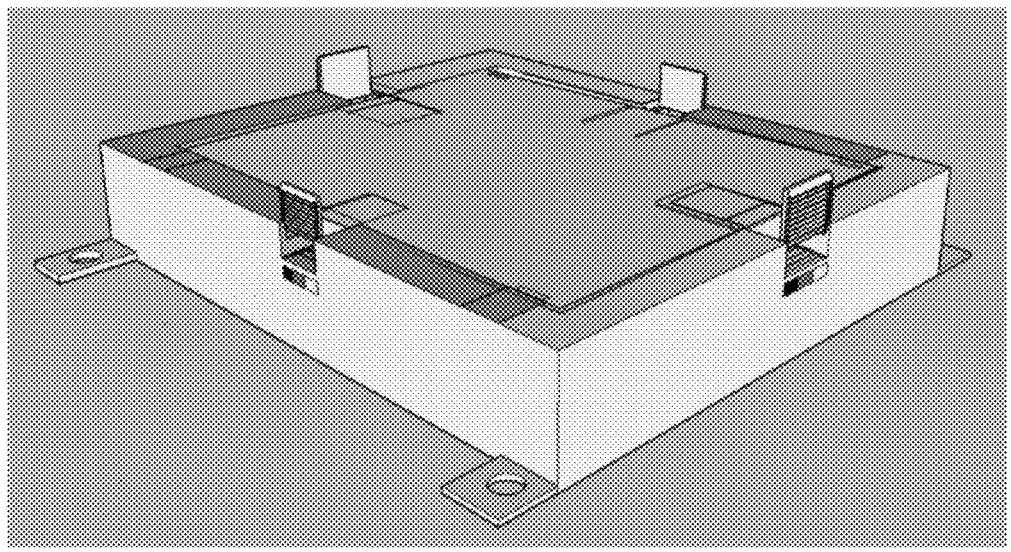
FIG. 12F is a top perspective view of a fully assembled 4-port junction box in accordance with the present disclosure.

As depicted in FIG. 12D, the assembly of the 4-port Pre-Wired Electrical Junction Box is comprised of the FIG. 12C—Inner Junction Box Wire Clip Attachment Plate with Assembled Wire Trap Assembly-4B, Black Concentric Insulated Wire-11A, Common Concentric Insulated Wire-11B and White Concentric Insulated Wire-11C and FIG. 12B—Outer Junction Box Wire Housing As depicted in FIG. 12E, the assembly of the 4-Port Pre-Wired Electrical Junction Box is comprised of Assembled Wire Clip Assembly-4C, Inner Junction Box Wire Clip Attachment Plate-Front View-12A, Outer Junction Box Wire Housing-12B, Black Concentric Insulated Wire-11A, Common Concentric Insulated Wire-11B and the White Concentric Insulated Wire-11C, As depicted in FIG. 12F, the Quick-Connect 4-Port Pre-Wired Junction Box is fully assembled.

The present invention, therefore, provides a multi-port electrical connector in the form of a receptacle containing a plurality of triple-in-line female contact members which are provided with three contact portions for electrically engaging three wires to a multitude of similar wiring ports.

Although the invention has been described in connection with a preferred embodiment, it should be understood that various modifications, additions and alterations may be made to the invention by one skilled in the art without departing from the spirit and scope of the invention as defined in the appended claims.

Figure 13A:
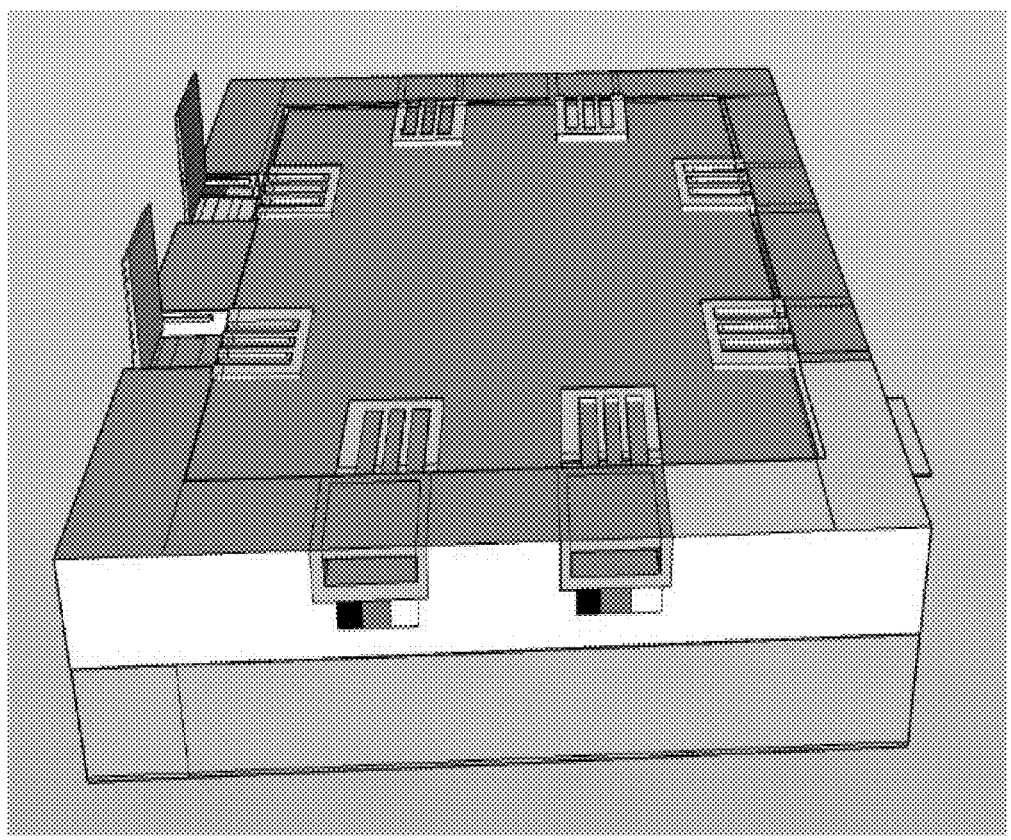
FIG. 13A is a top perspective view of a fully assembled 8-port junction box with flat-type wire connectors in accordance with the present disclosure.

As described by FIG. 13A, the Quick-Connect Push-in eight port Electrical Connector Flat-Top Junction Box 1 is a complete assembly of all previously described parts.

Figure 13B:
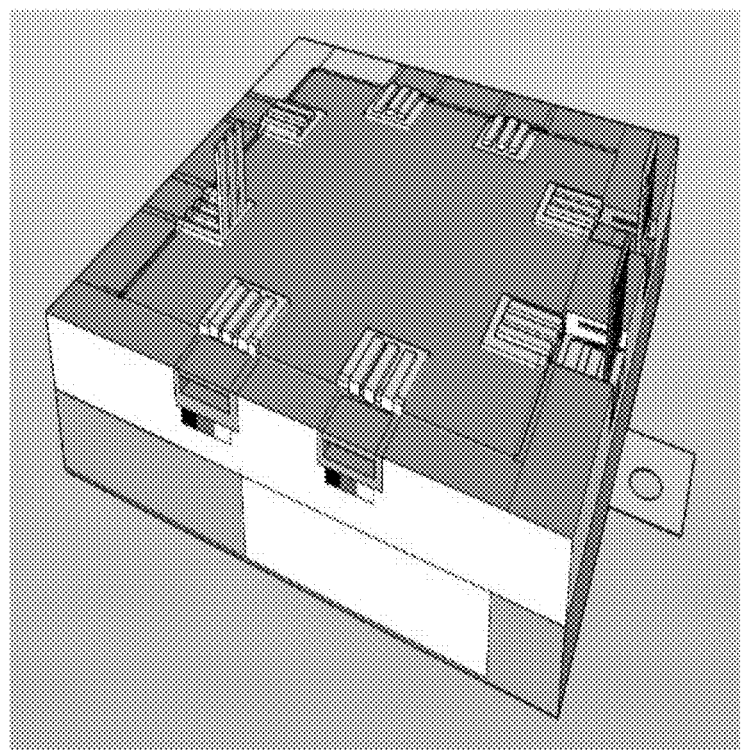
FIG. 13B is a top perspective view of a fully assembled 8-port junction box with lever-type wire connectors in accordance with the present disclosure.

As described by FIG. 13B, the Quick-Connect Push-in eight port Electrical Connector Lever-Top Junction Box 2 is a complete assembly of all previously described parts.

Figure 13C:
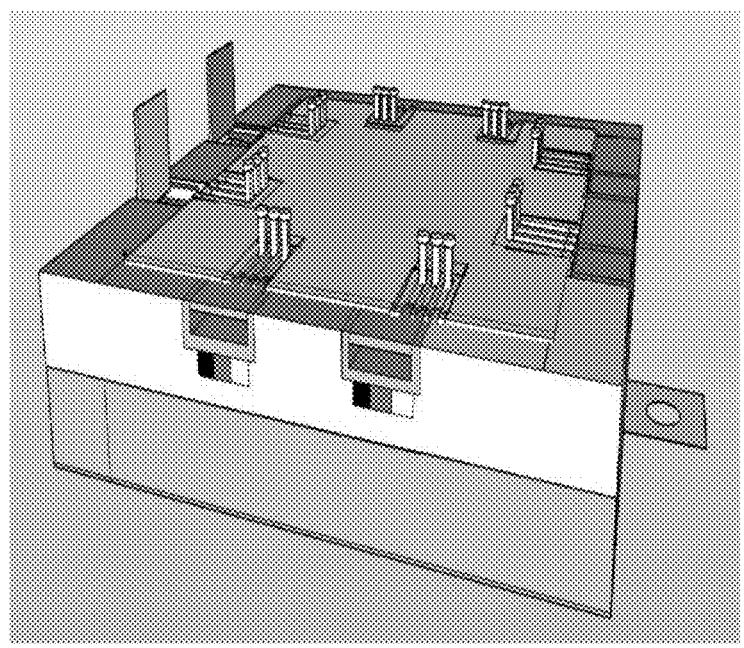
FIG. 13C is a top perspective view of a fully assembled 8-port junction box with push-type wire connectors in accordance with the present disclosure.

As described by FIG. 13C, the Quick-Connect Push-in eight port Electrical Connector Push-Top Junction Box 3 is a complete assembly of all previously described parts.

Figure 13D:
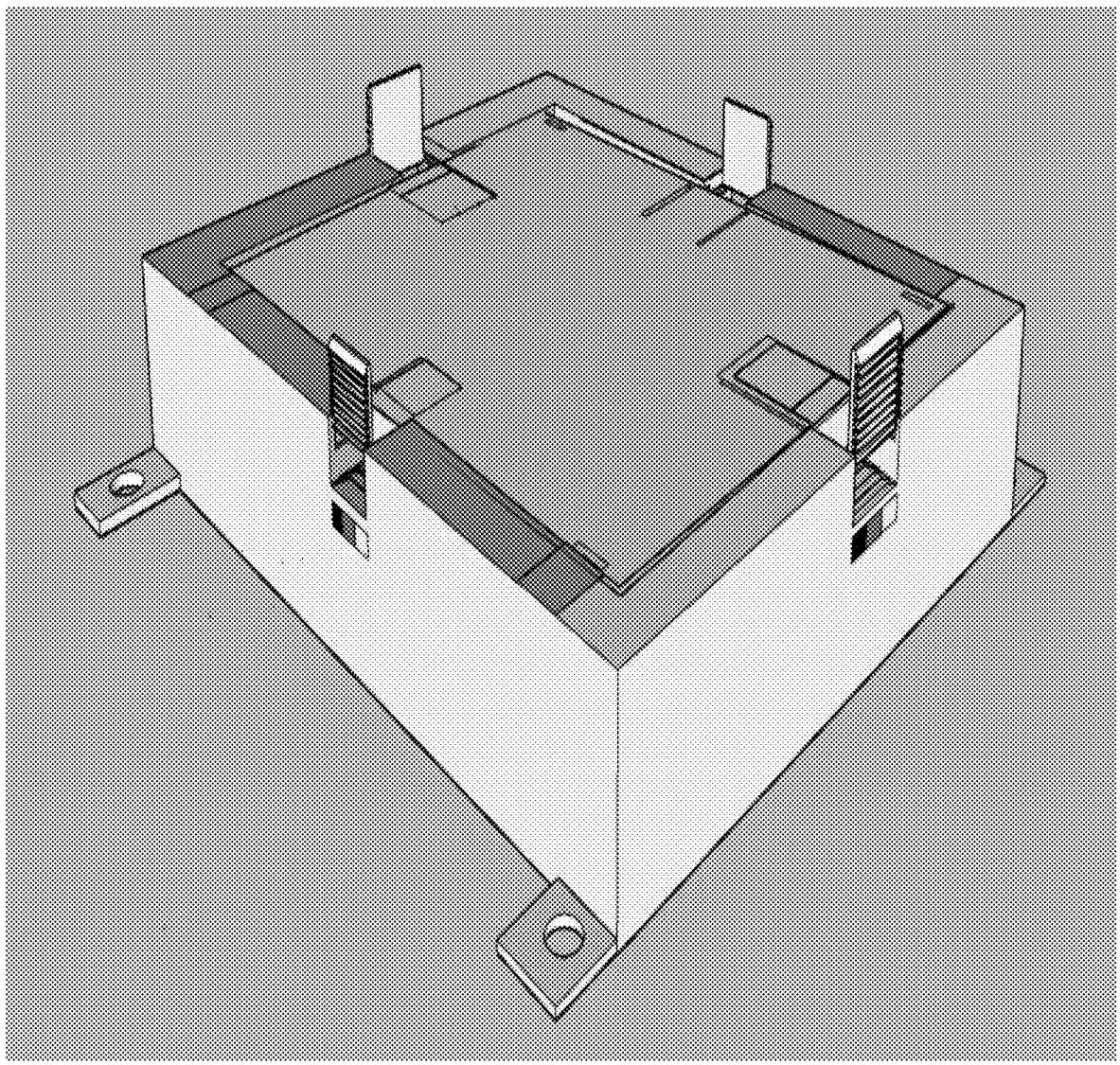
FIG. 13D is a top perspective view of a fully assembled 4-port junction box in accordance with the present disclosure.

As depicted in FIG. 13D, the Quick-Connect 4-Port Pre-Wired Junction Box is fully assembled.

What is claimed is:

1. A pre-wired junction box for electrically connecting the at least three wires that lead from an electric power supply to another at least three wires that lead to each of at least one electrically powered device, the pre-wired junction box comprising:
    at least one housing, wherein each housing, itself, comprises:
        at least four ports formed therewithin;
        a looped first carrier wire;
        a looped second carrier wire;
        a looped ground wire; and
        wherein each port is defined by a sub-housing containing at least three wire connectors that are each configured to conductively connect one of the looped wires to another wire that either leads from the power supply or leads to an electrically powered device.

2. The pre-wired junction box of claim 1, wherein said at least one housing is substantially fabricated of non-conductive material and said wire connectors are at least partially fabricated of conductive material.

3. The pre-wired junction box of claim 1, wherein said first carrier wire is a supply wire and said second carrier wire is a neutral wire.

4. The pre-wired junction box of claim 1, wherein each of said wire connectors comprises:
    a pair of horizontal plates fabricated of electrically conductive material, wherein the horizontal plates are generally parallel to each other when in a relaxed state;
    a vertical plate to which the horizontal plates are each attached at their respective distal ends, wherein the horizontal plates are vertically spaced such that a wire may be inserted between and clampingly engaged by them;
    a partially tubular sleeve fabricated of electrically conductive material and attached to at least one of the horizontal or vertical plates, the sleeve configured to telescopically receive one of said looped wires.

5. A pre-wired junction box for electrically connecting the at least three wires that lead from an electric power supply to another at least three wires that lead to an electrically powered device, the pre-wired junction box comprising:
    a housing;
    a looped first carrier wire disposed within the housing;
    a looped second carrier wire disposed within the housing;
    a looped ground wire disposed within the housing;
    a first wire connector, attached to the first carrier wire loop, that conductively connects the first wire leading from the power supply to the looped first carrier wire;
    a second wire connector, attached to the first carrier wire loop, that conductively connects the first wire leading to the powered device to the looped first carrier wire;
    a third wire connector, attached to the second carrier wire loop, that conductively connects the second wire leading from the power supply to the looped second carrier wire;
    a fourth wire connector, attached to the second carrier wire loop, that conductively connects the second wire leading to the powered device to the looped second carrier wire;
    a fifth wire connector, attached to the ground wire loop, that conductively connects the third wire leading from the power supply to the looped ground wire; and
    a sixth wire connector, attached to the ground wire loop, that conductively connects the third wire leading to the powered device to the looped ground wire.

6. The pre-wired junction box of claim 5, wherein said housing comprises:
    a first sub-housing within which said first, second and third wire connectors are disposed; and
    and a second sub-housing within which said fourth, fifth and sixth wire connectors are disposed.

7. The pre-wired junction box of claim 5, wherein said housing is substantially fabricated of non-conductive material and said wire connectors are at least partially fabricated of conductive material.

8. The pre-wired junction box of claim 5, wherein said looped first carrier wire is a supply wire and said looped second carrier wire is a neutral wire.

9. The pre-wired junction box of claim 5, wherein each of said wire connectors comprises:
    a pair of horizontal plates fabricated of electrically conductive material, wherein the horizontal plates are generally parallel to each other when in a relaxed state;
    a vertical plate to which the horizontal plates are each attached at their respective distal ends, wherein the horizontal plates are vertically spaced such that a wire may be inserted between and clampingly engaged by them;

a partially tubular sleeve fabricated of electrically conductive material and attached to at least one of the horizontal or vertical plates, the sleeve configured to telescopically receive one of said looped wires.

10. The pre-wired junction box of claim 5, wherein:

said pair of horizontal plates of said first wire connector clampingly engage the first wire leading from the power supply, and said partially tubular sleeve of said first wire connector telescopically engages said looped first carrier wire;

said pair of horizontal plates of said second wire connector clampingly engage the first wire leading to the powered device, and said partially tubular sleeve of said second wire connector telescopically engages said looped first carrier wire;

said pair of horizontal plates of said third wire connector clampingly engage the second wire leading from the power supply, and said partially tubular sleeve of said third wire connector telescopically engages said looped second carrier wire;

said pair of horizontal plates of said fourth wire connector clampingly engage the second wire leading to the powered device, and said partially tubular sleeve of said fourth wire connector telescopically engages said looped second carrier wire;

said pair of horizontal plates of said fifth wire connector clampingly engage the third wire leading from the power supply, and said partially tubular sleeve of said fifth wire connector telescopically engages said looped ground wire; and said pair of horizontal plates of said sixth wire connector clampingly engage the third wire leading to the powered device, and said partially tubular sleeve of said sixth wire connector telescopically engages said looped ground wire.

11. The pre-wired junction box of claim 5, wherein:

a first sheath telescopically covers said looped first carrier wire, and this first sheath has at least two wire-exposing openings formed therealong;

a second sheath telescopically covers said looped second carrier wire, and this second sheath has at least two wire-exposing openings formed therealong; and a third sheath telescopically covers said looped ground wire, and this third sheath has at least two wire-exposing openings formed therealong.

12. The pre-wired junction box of claim 11, wherein:

said first wire connector attaches to said looped first carrier wire at a first wire-exposing opening therealong, thereby electrically connecting the first wire leading from the power supply to said looped first carrier wire;

said second wire connector attaches to said looped first carrier wire at a second wire-exposing opening therealong, thereby electrically connecting the first wire leading to the powered device to said looped first carrier wire;

said third wire connector attaches to said looped second carrier wire at a first wire-exposing opening therealong, thereby electrically connecting the second wire leading from the power supply to said looped second carrier wire;

said fourth wire connector attaches to said looped second carrier wire at a second wire-exposing opening therealong, thereby electrically connecting the second wire leading to the powered device to said looped second carrier wire;

said fifth wire connector attaches to said looped ground wire at a first wire-exposing opening therealong, thereby electrically connecting the third wire leading from the power supply to said looped ground wire; and said sixth wire connector attaches to said looped ground wire at a second wire-exposing opening therealong, thereby electrically connecting the third wire leading to the powered device to said looped ground wire.

13. A quick-connect clip apparatus for electrically connecting two wires within a junction box, the clip apparatus comprising:

a pair of horizontal plates fabricated of electrically conductive material, wherein the horizontal plates are generally parallel to each other when in a relaxed state;

a vertical plate to which the horizontal plates are each attached at their respective distal ends, wherein the horizontal plates are vertically spaced such that a first wire may be inserted between and clampingly engaged by them;

a partially tubular sleeve fabricated of electrically conductive material and attached to at least one of the horizontal or vertical plates, the sleeve configured to telescopically receive a second wire.

14. The quick-connect clip apparatus of claim 13, wherein said horizontal plates have facing, unidirectional serrated surfaces configured to be more resistant to withdrawal travel of a wire that is inserted therebetween than to insertion travel of a wire therebetween.

15. The quick-connect clip apparatus of claim 13, further comprising a first vertical flange extending from one of said horizontal plates toward the other said horizontal plate, wherein this first vertical flange defines a barrier for the end of the first wire to encounter and have its insertion travel stopped by when it is inserted between said horizontal plates.

16. The quick-connect clip apparatus of claim 15, further comprising a second vertical flange extending from one of said horizontal plates toward the other said horizontal plate, wherein this second horizontal flange is coplanar with, but vertically spaced apart from, said first vertical flange when said horizontal plates are in a relaxed state with no wire inserted therebetween, wherein the vertical flanges, together, define a barrier for the end of the first wire to encounter and have its insertion travel stopped by when it is inserted between said horizontal plates.

17. The quick-connect clip apparatus of claim 13, further comprising an axially offset pair of rollbars disposed between said horizontal plates and positioned distal said first vertical flange, wherein the rollbars are configured to press against each other and, thereby, cause the respective portions of said horizontal plates which span proximal said first vertical flange to vertically diverge and unclamp a first wire that is inserted therebetween when pinching force is applied to said horizontal plates at points distal the rollbars.

\* \* \* \* \*